United States Patent
Yuan et al.

(10) Patent No.: US 11,893,884 B2
(45) Date of Patent: Feb. 6, 2024

(54) METHOD FOR ACQUIRING THREE-DIMENSIONAL PERCEPTION INFORMATION BASED ON EXTERNAL PARAMETERS OF ROADSIDE CAMERA, AND ROADSIDE DEVICE

(71) Applicant: Apollo Intelligent Connectivity (Beijing) Technology Co., Ltd., Beijing (CN)

(72) Inventors: Libin Yuan, Beijing (CN); Jinrang Jia, Beijing (CN); Guangqi Yi, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 215 days.

(21) Appl. No.: 17/498,638

(22) Filed: Oct. 11, 2021

(65) Prior Publication Data
US 2022/0028260 A1 Jan. 27, 2022

(30) Foreign Application Priority Data
Dec. 30, 2020 (CN) .......................... 202011630696.8

(51) Int. Cl.
G08G 1/04 (2006.01)
G06V 20/13 (2022.01)
G08G 1/01 (2006.01)

(52) U.S. Cl.
CPC ............... G08G 1/04 (2013.01); G06V 20/13 (2022.01); G08G 1/0116 (2013.01); G08G 1/0141 (2013.01); G08G 1/0145 (2013.01)

(58) Field of Classification Search
CPC .......... G08G 1/0116; G08G 1/09; G08G 1/04; G06T 7/80; G06T 7/55; G06T 7/00
See application file for complete search history.

(56) References Cited

U.S. PATENT DOCUMENTS

2008/0166019 A1* 7/2008 Lee ........................... G06T 7/60
382/106
2009/0110267 A1* 4/2009 Zakhor ..................... G06T 7/75
382/154
(Continued)

FOREIGN PATENT DOCUMENTS

CN 104361603 A * 2/2015 ............. G06T 7/004
CN 104361603 B 4/2017
(Continued)

OTHER PUBLICATIONS

First Office Action of the parallel application JP2021-178763.
(Continued)

Primary Examiner — Rowina J Cattungal
(74) Attorney, Agent, or Firm — J.C. PATENTS

(57) ABSTRACT

The present application discloses a method for acquiring three-dimensional perception information based on external parameters of a roadside camera, and a roadside device. The specific implementation solution is as follows: acquiring a first matching point pair between an image captured by the first camera and an image captured by the second camera, and generating a first rotation matrix, where the first rotation matrix represents a rotation matrix of the first camera in a second camera coordinate system; generating a third rotation matrix according to the first rotation matrix and the second rotation matrix, where the second rotation matrix represents a rotation matrix of the second camera in a world coordinate system, and the third rotation matrix represents a rotation matrix of the first camera in the world coordinate system; generating three-dimensional perception information of the image captured by the first camera according to the third rotation matrix.

20 Claims, 10 Drawing Sheets

(56) References Cited

U.S. PATENT DOCUMENTS

| | | | |
|---|---|---|---|
| 2010/0295948 A1* | 11/2010 | Xie | G06T 7/80 |
| | | | 348/E17.002 |
| 2011/0310255 A1* | 12/2011 | Medeiros | H04B 17/40 |
| | | | 348/E17.002 |
| 2019/0012766 A1 | 1/2019 | Yoshimi | |
| 2020/0265586 A1* | 8/2020 | Yang | G06T 7/97 |
| 2021/0183040 A1* | 6/2021 | Liu | H04N 17/002 |

FOREIGN PATENT DOCUMENTS

| | | | | | |
|---|---|---|---|---|---|
| CN | 108447095 A | 8/2018 | | | |
| CN | 108711166 A | 10/2018 | | | |
| CN | 109509226 A | 3/2019 | | | |
| CN | 109859314 A | 6/2019 | | | |
| CN | 110473262 A | 11/2019 | | | |
| CN | 110599546 A | 12/2019 | | | |
| CN | 107886547 B | 4/2020 | | | |
| CN | 110988947 A | 4/2020 | | | |
| CN | 111223038 A | 6/2020 | | | |
| CN | 111462029 A | 7/2020 | | | |
| CN | 111612760 A | 9/2020 | | | |
| CN | 111783502 A | 10/2020 | | | |
| CN | 111932627 A | 11/2020 | | | |
| EP | 3057062 A1 | 8/2016 | | | |
| JP | H1062145 A | 3/1998 | | | |
| JP | 2003331383 A | * | 11/2003 | | |
| JP | 2003331383 A | 11/2003 | | | |
| JP | 2008299458 A | 12/2008 | | | |
| JP | 2012526995 A | 11/2012 | | | |
| JP | 2013092871 A | 5/2013 | | | |
| JP | 2013168757 A | 8/2013 | | | |
| JP | 2013168757 A | * | 8/2013 | | G06K 9/00771 |
| JP | 2015232442 A | * | 12/2015 | | G01C 3/06 |
| JP | 2015232442 A | 12/2015 | | | |
| JP | 2018180860 A | 11/2018 | | | |
| JP | 2018180860 A | * | 11/2018 | | |
| KR | 102235951 B1 | 4/2021 | | | |
| WO | WO-2019049331 A1 | * | 3/2019 | | |
| WO | WO2019049331 A1 | 3/2019 | | | |

OTHER PUBLICATIONS

European Search Report for the parallel application EP21202220.6.
Notice of Allowance of the parallel application KR10-2021-0137767.
First Office Action of the priority application CN202011630696.8.

* cited by examiner

METHOD FOR ACQUIRING THREE-DIMENSIONAL PERCEPTION INFORMATION BASED ON EXTERNAL PARAMETERS OF ROADSIDE CAMERA, AND ROADSIDE DEVICE

CROSS-REFERENCE TO RELATED APPLICATIONS

The present application claims priority to Chinese Patent Application No. 202011630696.8, filed on Dec. 30, 2020, which is hereby incorporated by reference in its entirety.

TECHNICAL FIELD

The present application relates to automatic driving, intelligent traffic and computer vision in computer technologies and, in particular, to a method for acquiring three-dimensional perception information based on external parameters of a roadside camera, and a roadside device.

BACKGROUND

In order to provide three-dimensional perception information for a vehicle by a roadside perception system, a roadside camera may be provided at an intersection for acquiring image, and then the three-dimensional perception information is acquired according to the image acquired by the roadside camera. When acquiring the three-dimensional perception information according to the image acquired by the roadside camera, it is necessary to obtain a rotation matrix of the roadside camera in a world coordinate system.

In the prior art, the rotation matrix of the roadside camera in the world coordinate system may be obtained in advance through a dotting manner of a high-precision map or a manual real-time kinematic (RTK) device, thereby generating the three-dimensional perception information.

However, in the prior art, since the manufacturing cost of the high-precision map is high and the high-precision map cannot be used when there are no lane lines, the cost of determining the rotation matrix of the roadside camera in the world coordinate system is high. In the dotting manner of the manual RTK device, there is a problem of low efficiency and personal danger, and the rotation matrix of the roadside camera in the world coordinate system cannot be obtained in time and effectively. Through the above manners, the three-dimensional perception information cannot be obtained effectively and quickly.

SUMMARY

The present application provides a method for acquiring three-dimensional perception information based on external parameters of a roadside camera, and a roadside device to obtain the three-dimensional perception information effectively and quickly.

According to a first aspect of the present application, a method for acquiring three-dimensional perception information based on external parameters of a roadside camera is provided, the roadside camera includes a first camera and a second camera having a common view area, where the method includes:

acquiring a first matching point pair between an image captured by the first camera and an image captured by the second camera, and generating a first rotation matrix according to the first matching point pair, where the first rotation matrix represents a rotation matrix of the first camera in a second camera coordinate system;

acquiring a second rotation matrix, where the second rotation matrix represents a rotation matrix of the second camera in a world coordinate system, and generating a third rotation matrix according to the first rotation matrix and the second rotation matrix, and the third rotation matrix represents a rotation matrix of the first camera in the world coordinate system; and generating three-dimensional perception information of the image captured by the first camera according to the third rotation matrix.

According to a second aspect of the present application, an apparatus for acquiring three-dimensional perception information based on external parameters of a roadside camera is provided, the roadside camera includes a first camera and a second camera having a common view area, where the apparatus includes:

a first acquiring unit configured to acquire a first matching point pair between an image captured by the first camera and an image captured by the second camera;

a first generating unit configured to generate a first rotation matrix according to the first matching point pair, where the first rotation matrix represents a rotation matrix of the first camera in a second camera coordinate system;

a second acquiring unit configured to acquire a second rotation matrix, where the second rotation matrix represents a rotation matrix of the second camera in a world coordinate system;

a second generating unit configured to generate a third rotation matrix according to the first rotation matrix and the second rotation matrix, and the third rotation matrix represents a rotation matrix of the first camera in the world coordinate system; and a third generating unit configured to generate three-dimensional perception information of the image captured by the first camera according to the third rotation matrix.

According to a third aspect of the present application, an electronic device is provided, including: at least one processor; and a memory communicatively coupled to the at least one processor, where the memory stores instructions executable by the at least one processor, and the instructions are executed by the at least one processor to cause the at least one processor to perform the above method.

According to a fourth aspect of the present application, a non-transitory computer readable storage medium having computer instructions stored thereon is provided, where the computer instructions are configured to cause a computer to perform the above method.

According to a fifth aspect of the present application, a computer program product is provided, the program product includes a computer program which is stored in a readable storage medium, at least one processor of an electronic device can read the computer program from the readable storage medium, and the at least one processor executes the computer program to cause the electronic device to perform the method of the first aspect.

According to a sixth aspect of the present application, a roadside device is provided, which includes the electronic device of the third aspect.

According to a seventh aspect of the present application, a cloud control platform is provided, which includes the electronic device of the third aspect.

According to the solution of the present application, generating the three-dimensional perception information of the image captured by the first camera is unnecessary to adopt a dotting manner of a high-precision map or a manual RTK device, thereby reducing costs, improving efficiency, and ensuring personnel safety. Further, three-dimensional perception information of the image captured by the first camera is obtained effectively. Furthermore, when the first camera is a fisheye camera and the second camera is a rear-view gun camera, a rotation matrix of the fisheye camera in the world coordinate system (namely, the third rotation matrix) can be obtained according to a rotation matrix of the rear-view gun camera in the world coordinate system (namely, the second rotation matrix). When the first camera is a fisheye camera and the second camera is a front-view gun camera, the rotation matrix of the fisheye camera in the world coordinate system (namely, the third rotation matrix) can be obtained according to a rotation matrix of the front-view gun camera in the world coordinate system (namely, the second rotation matrix).

It should be appreciated that statements in this section are not intended to identify key features or essential features of embodiments of the present application, nor are they intended to limit scope of the present application. Other features of the present application will be readily understood from the following description.

BRIEF DESCRIPTION OF DRAWINGS

The drawings are included to provide a better understanding of the solution and are not to be construed as limitations of the present application. Where.

DESCRIPTION OF EMBODIMENTS

Exemplary embodiments of the present application are described below in conjunction with the accompanying drawings, which include various details of the embodiments of the present application to facilitate understanding, and should be considered as merely exemplary. Therefore, a person of ordinary skill in the art will recognize that various changes and modifications of the embodiments described herein can be made without departing from the scope and the spirit of the present application. Also, descriptions of well-known functions and constructions are omitted in the following for clarity and conciseness.

In order to provide three-dimensional perception information for a vehicle in a roadside perception system, a roadside camera may be disposed on an upright rod of an intersection, where the roadside camera includes a fisheye camera, a rear-view gun camera, and a front-view gun camera. In general, the fisheye camera, the rear-view gun camera and the front-view gun camera may be disposed simultaneously on the upright rod of each intersection. An image is acquired by the roadside camera, and three-dimensional perception information of the image captured by each roadside camera is acquired according to the image acquired by each roadside camera.

Figure 1:
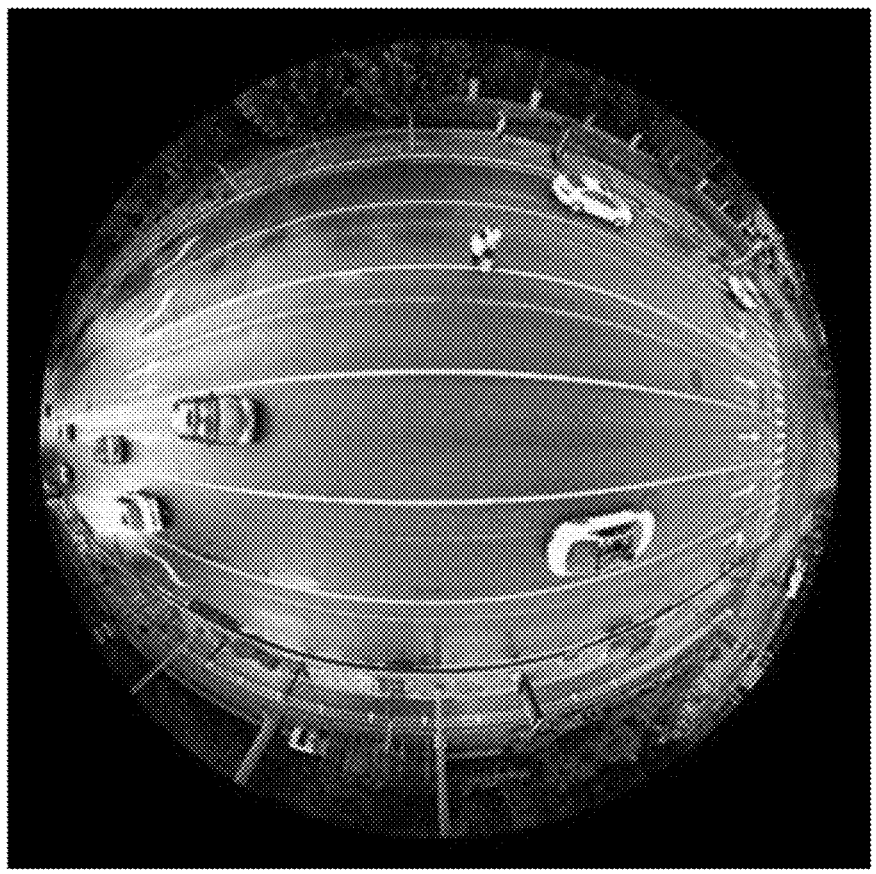
FIG. 1 is an image captured by a fisheye camera.

When acquiring the three-dimensional perception information according to the image acquired by the roadside camera, it is necessary to obtain a rotation matrix of the roadside camera in a world coordinate system, and then the three-dimensional perception information of the image captured by the roadside camera is obtained according to the rotation matrix of the roadside camera in the world coordinate system. For example, FIG. 1 is an image captured by a fisheye camera. The image captured by the fisheye camera is distorted, and thus a rotation matrix of the fisheye camera in the world coordinate system needs to be obtained, so as to obtain three-dimensional perception information of the image captured by the fisheye camera.

In the prior art, a rotation matrix of each roadside camera in the world coordinate system may be obtained in advance through a dotting manner of a high-precision map or an RTK device, and then three-dimensional perception information of the image captured by each roadside camera is generated. In an example, GPS (Global Positioning System) three-dimensional coordinates of a mark point may be obtained in advance through the dotting manner of the high-precision map or the RTK device. Then, each roadside camera captures an image, and two-dimensional coordinates of the mark point on the image is determined. For each roadside camera, PNP (perspective-n-point, PNP for short) resolving processing is performed according to the three-dimensional coordinates of the mark point and the two-dimensional coordinates of the mark point to obtain the rotation matrix of each roadside camera in the world coordinate system.

However, in the above manner, since the manufacturing cost of the high-precision map is high and the high-precision map cannot be used when there are no lane lines, the cost of determining the rotation matrix of the roadside camera in the world coordinate system is high. In the dotting manner of a manual RTK device, there is a problem of low efficiency and personal danger, and the rotation matrix of the roadside camera in the world coordinate system cannot be obtained in time and effectively.

The present application provides a method for acquiring three-dimensional perception information based on external parameters of a roadside camera, and a roadside device, which is applied to automatic driving, intelligent traffic and computer vision in computer technologies, so as to obtain the rotation matrix of the roadside camera in the world coordinate system accurately and quickly, thereby obtaining the three-dimensional perception information effectively and quickly.

Figure 2:
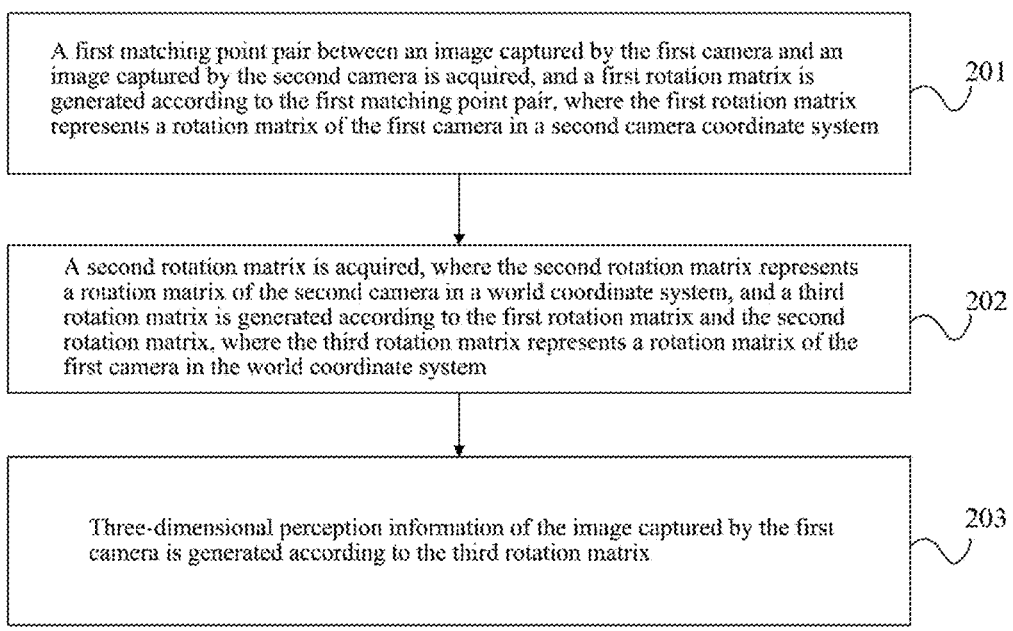
FIG. 2 is a schematic view according to a first embodiment of the present application.

FIG. 2 is a schematic view according to a first embodiment of the present application. As shown in FIG. 2, a method for acquiring three-dimensional perception information based on external parameters of a roadside camera provided in this embodiment includes the following.

201: A first matching point pair between an image captured by the first camera and an image captured by the second camera is acquired, and a first rotation matrix is generated according to the first matching point pair, where the first rotation matrix represents a rotation matrix of the first camera in a second camera coordinate system.

Illustratively, the roadside camera in the embodiment includes a first camera and a second camera having a common view area. In an example, the first camera is a fisheye camera, and the second camera is a rear-view gun camera; or the first camera is a fisheye camera, and the second camera is a front-view gun camera.

The execution entity of the embodiment may be an electronic device, where the electronic device may be a terminal device, a server, or another apparatus or device that may execute the method of the embodiment. Alternatively, the execution entity of each embodiment in the present application may be various roadside devices, where a roadside device is, for example, a roadside perception device having a computing function and a roadside computing device connected to the roadside perception device. The execution entity of each embodiment in the present application may also be a server device connected to the roadside computing device, or a server device directly connected to the roadside perception device. In the present application, the server device is, for example, a cloud control platform, a vehicle-road collaboration management platform, a central subsystem, an edge computing platform, a cloud computing platform, etc. In a system architecture of intelligent traffic vehicle-road collaboration, the roadside device includes a roadside perception device and a roadside computing device, the roadside perception device (for example, a roadside camera) is connected to the roadside computing device (for example, a roadside computing unit RSCU), the roadside computing device is connected to the server device, and the server device can communicate with an automatic driving vehicle or an assisted driving vehicle in various ways. In another system architecture, the roadside perception device itself includes a computing function, and the roadside perception device is directly connected to the server device. The above connections may be wired or wireless; and in the present application, the server device is, for example, a cloud control platform, a vehicle-road collaboration management platform, a central subsystem, an edge computing platform, a cloud computing platform, etc.

Firstly, the following concepts are introduced. "A rear-view gun camera coordinate system" refers to a coordinate system used by an image captured by a rear-view gun camera. "A front-view gun camera coordinate system" refers to a coordinate system used by an image captured by a front-view gun camera. "A fisheye camera coordinate system" refers to a coordinate system used by an image captured by a fisheye camera.

Since the first camera and the second camera have the common view area, and then for the common view area, the first matching point pair between the common view area in the image captured by the first camera and the common view area in the image captured by the second camera can be generated. The first matching point pair includes N pairs of image points, each pair of image points includes one image point on a de-distorted image corresponding to the first camera and one image point on a de-distorted image corresponding to the second camera, where N is a positive integer greater than or equal to 1. Each image point in the first matching point pair is a two-dimensional image point.

Then, the first matching point pair may be processed by using epipolar geometry algorithm to obtain the first rotation matrix, where the first rotation matrix represents a rotation matrix of the first camera in the second camera coordinate system.

202: A second rotation matrix is acquired, where the second rotation matrix represents a rotation matrix of the second camera in a world coordinate system, and a third rotation matrix is generated according to the first rotation matrix and the second rotation matrix, where the third rotation matrix represents a rotation matrix of the first camera in the world coordinate system.

Illustratively, the second rotation matrix may be acquired by the dotting manner of the high-precision map or the RTK device, where the second rotation matrix represents the rotation matrix of the second camera in the world coordinate system.

Then, the first rotation matrix and the second rotation matrix are subjected to matrix multiplication processing to obtain the third rotation matrix, where the third rotation matrix represents the rotation matrix of the first camera in the world coordinate system.

203: Three-dimensional perception information of the image captured by the first camera is generated according to the third rotation matrix.

Illustratively, since the image captured by the first camera includes two-dimensional perception information, and the third rotation matrix represents the rotation matrix of the first camera in the world coordinate system, and then the two-dimensional perception information of the image captured by the first camera may be converted into the world coordinate system according to the third rotation matrix, thereby obtaining the three-dimensional perception information of the image captured by the first camera.

The two-dimensional perception information refers to pixel coordinates of an object in a two-dimensional image. In an example, the two-dimensional perception information may be two-dimensional perception information of an object in an image, where the object includes, but is not limited to, a motor vehicle, a non-motor vehicle, a pedestrian, a lane line, and the like.

In an example, the first camera is a fisheye camera and the second camera is a rear-view gun camera, and then a rotation matrix of the fisheye camera in the world coordinate system (namely, the third rotation matrix) can be obtained according to a rotation matrix of the rear-view gun camera in the world coordinate system (namely, the second rotation matrix). Thus, "the rotation matrix of the rear-view gun camera in the world coordinate system" and "the rotation matrix of the fisheye camera in the world coordinate system" are obtained, and there is no need to obtain the rotation matrix of the fisheye camera in the world coordinate system (namely, the third rotation matrix) by adopting the dotting manner of the high-precision map or the manual RTK device. Thus, the cost can be reduced, the efficiency can be improved, the rotation matrix of the fisheye camera in the world coordinate system (namely, the third rotation matrix) can be obtained effectively and quickly, and then the three-dimensional perception information of the image captured by the fisheye camera can be obtained effectively and quickly.

When the first camera is a fisheye camera and the second camera is a rear-view gun camera, the fisheye camera and the rear-view gun camera have a common view area, and then for the common view area, a first matching point pair between the common view area in the image captured by the fisheye camera and the common view area in the image captured by the rear-view gun camera can be generated. The first matching point pair includes N pairs of image points, and each pair of image points includes one image point on a de-distorted image corresponding to the fisheye camera and one image point on a de-distorted image corresponding to the rear-view gun camera.

Then, the first matching point pair may be processed by using epipolar geometry algorithm to obtain the first rotation matrix, where the first rotation matrix represents a rotation matrix of the fisheye camera in the rear-view gun camera coordinate system. "The rear-view gun camera coordinate system" refers to a coordinate system used by the image captured by the rear-view gun camera.

The second rotation matrix may be acquired by the dotting manner of the high-precision map or the RTK device, where the second rotation matrix represents the rotation matrix of the rear-view gun camera in the world coordinate system.

Then, the first rotation matrix and the second rotation matrix are subjected to matrix multiplication processing to obtain the third rotation matrix, where the third rotation matrix represents the rotation matrix of the fisheye camera in the world coordinate system. According to the third rotation matrix, the two-dimensional perception information in the image captured by the fisheye camera is converted into the world coordinate system, and then the three-dimensional perception information of the image captured by the fisheye camera is obtained.

In another example, the first camera is a fisheye camera and the second camera is a front-view gun camera, and then a rotation matrix of the fisheye camera in the world coordinate system (namely, the third rotation matrix) can be obtained according to a rotation matrix of the front-view gun camera in the world coordinate system (namely, the second rotation matrix). Thus, "the rotation matrix of the front-view gun camera in the world coordinate system" and "the rotation matrix of the fisheye camera in the world coordinate system" are obtained, and there is no need to obtain the rotation matrix of the fisheye camera in the world coordinate system (namely, the third rotation matrix) by adopting the dotting manner of the high-precision map or the manual RTK device. Thus, the cost can be reduced, the efficiency can be improved, the rotation matrix of the fisheye camera in the world coordinate system (namely, the third rotation matrix) can be obtained effectively and quickly, and then the three-dimensional perception information of the image captured by the fisheye camera can be obtained effectively and quickly.

When the first camera is a fisheye camera and the second camera is a front-view gun camera, the fisheye camera and the front-view gun camera have a common view area, and then for the common view area, a first matching point pair between the common view area in the image captured by the fisheye camera and the common view area in the image captured by the front-view gun camera can be generated. The first matching point pair includes N pairs of image points, and each pair of image points includes one image point on a de-distorted image corresponding to the fisheye camera and one image point on a de-distorted image corresponding to the front-view gun camera.

Then, the first matching point pair may be processed by using epipolar geometry algorithm to obtain the first rotation matrix, where the first rotation matrix represents a rotation matrix of the fisheye camera in the front-view gun camera coordinate system. "The front-view gun camera coordinate system" refers to a coordinate system used by the image captured by the front-view gun camera.

The second rotation matrix may be acquired by the dotting manner of the high-precision map or the RTK device, and the second rotation matrix represents the rotation matrix of the front-view gun camera in the world coordinate system.

Then, the first rotation matrix and the second rotation matrix are subjected to matrix multiplication processing to obtain the third rotation matrix, where the third rotation matrix represents the rotation matrix of the fisheye camera in the world coordinate system. According to the third rotation matrix, the two-dimensional perception information of the image captured by the fisheye camera is converted into the world coordinate system, and then the three-dimensional perception information of the image captured by the fisheye camera is obtained.

In the embodiment, the first rotation matrix is generated according to the first matching point pair between the image captured by the first camera and the image captured by the second camera, and the third rotation matrix is generated according to the first rotation matrix and the second rotation matrix. Since the first rotation matrix represents the rotation matrix of the first camera in the second camera coordinate system, and the second rotation matrix represents the rotation matrix of the second camera in the world coordinate system, and then the third rotation matrix obtained represents the rotation matrix of the first camera in the world coordinate system. Thus, the rotation matrix of the first camera in the world coordinate system is obtained, and then the three-dimensional perception information converted from the two-dimensional perception information of the image captured by the first camera may be generated according to the third rotation matrix. When generating the three-dimensional perception information of the image captured by the first camera, it is unnecessary to adopt a dotting manner of the high-precision map or the manual RTK device, thereby reducing costs, improving efficiency, and ensuring personnel safety. Further, three-dimensional perception information of the image captured by the first camera is obtained effectively. Furthermore, when the first camera is a fisheye camera and the second camera is a rear-view gun camera, the rotation matrix of the fisheye camera in the world coordinate system (namely, the third rotation matrix) can be obtained according to the rotation matrix of the rear-view gun camera in the world coordinate system (namely, the second rotation matrix). When the first camera is a fisheye camera and the second camera is a front-view gun camera, the rotation matrix of the fisheye camera in the world coordinate system (namely, the third rotation matrix) can be obtained according to the rotation matrix of the front-view gun camera in the world coordinate system (namely, the second rotation matrix).

Figure 3:
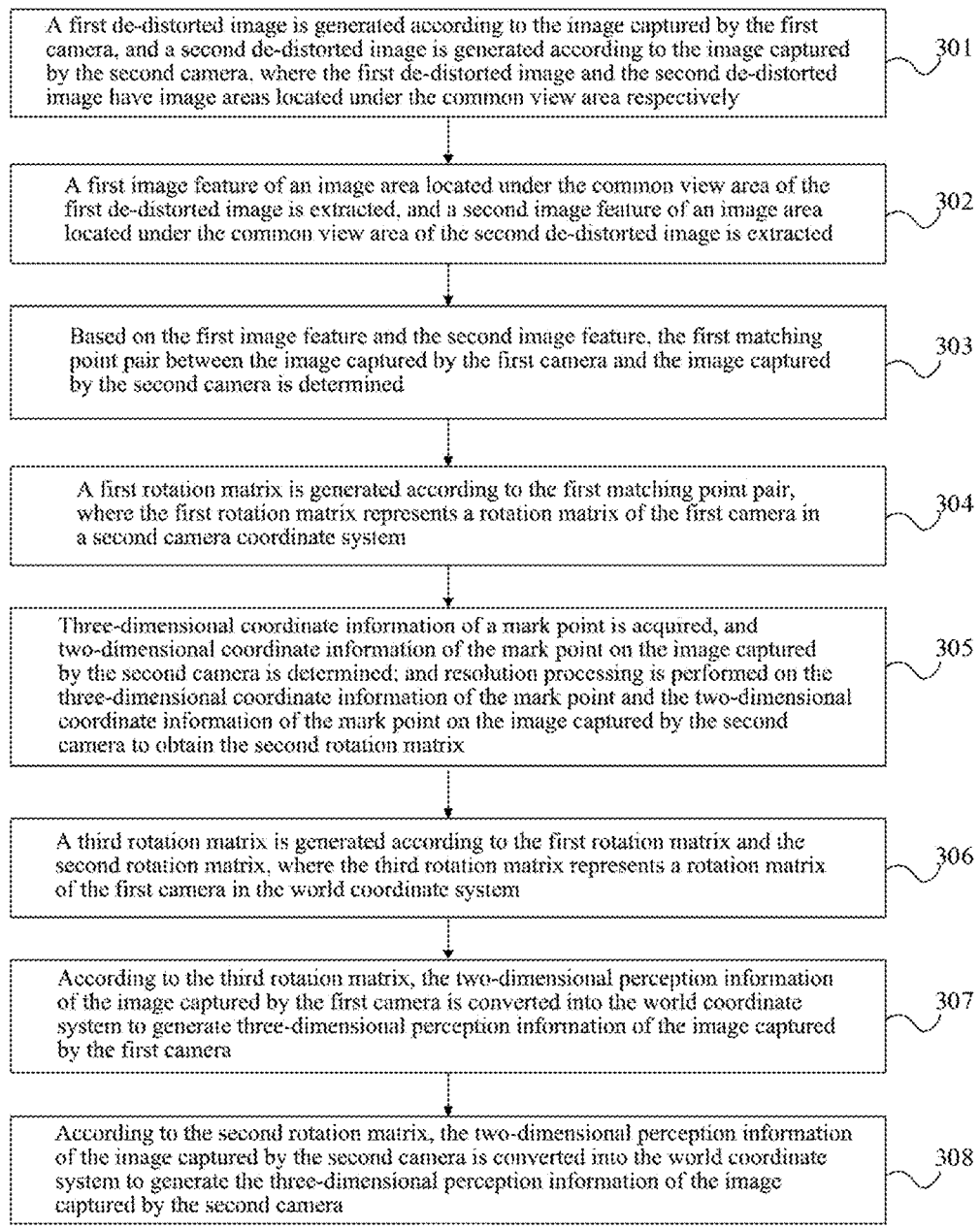
FIG. 3 is a schematic view according to a second embodiment of the present application.

FIG. 3 is a schematic view according to a second embodiment of the present application. As shown in FIG. 3, a method for acquiring three-dimensional perception information based on external parameters of a roadside camera provided in this embodiment includes the following.

301: A first de-distorted image is generated according to the image captured by the first camera, and a second de-distorted image is generated according to the image captured by the second camera, where the first de-distorted image and the second de-distorted image have image areas located under the common view area respectively.

In an example, step 301 includes the following steps: the image captured by the first camera is projected on a spherical surface to obtain a spherical image; de-distortion processing is performed on the spherical image to obtain the first de-distorted image; and the image captured by the second camera is adjusted by using a de-distortion function to obtain the second de-distorted image.

Illustratively, the roadside camera in the embodiment includes a first camera and a second camera having a common view area. In an example, the first camera is a fisheye camera, and the second camera is a rear-view gun camera; or, the first camera is a fisheye camera, and the second camera is a front-view gun camera.

The execution entity of the embodiment may be an electronic device, where the electronic device may be a terminal device, a server, or another apparatus or device that may execute the method of the embodiment.

Firstly, the image captured by the first camera and the image captured by the second camera are obtained. The first de-distorted image is generated according to the image captured by the first camera, and the second de-distorted image is generated according to the image captured by the second camera. In an example, since the first camera and the second camera have the common view area (i.e. images for the same area can be captured), thus the first de-distorted image and the second de-distorted image have image areas located under the common view area respectively.

Figure 4:
FIG. 4 is a schematic view of a first de-distorted image according to an embodiment of the present application.

In an example, the first camera is a fisheye camera, and the image captured by the first camera is projected on a spherical surface to obtain a spherical image. FIG. 4 is a schematic view of a first de-distorted image according to an embodiment of the present application. As shown in FIG. 4, de-distortion processing is performed on the spherical image to obtain the first de-distorted image. For this process, reference may be made to a current generation mode of a de-distorted image. The first de-distorted image is an image of an equivalent gun-type device. "The equivalent gun-type device" refers to: when images captured by different roadside cameras (a fisheye camera, a rear-view gun camera, or a front-view gun camera) can be mapped to a gun-type device (namely, a gun camera), the gun-type device can be referred to as an equivalent gun-type device.

The second camera is a rear-view gun camera or a front-view gun camera. The image captured by the second camera also has a certain distortion problem. The image captured by the second camera may be adjusted to obtain the second de-distorted image of the second camera. In an example, a de-distortion function in opencv may be adopted to adjust the image captured by the second camera to obtain the second de-distorted image.

For example, an opencv de-distortion function may be adopted to perform de-distortion processing on the image captured by the rear-view gun camera to obtain the second de-distorted image of the rear-view gun camera.

The image captured by the first camera may be adjusted in the above manner to obtain the first de-distorted image, and the image captured by the second camera is adjusted to obtain the second de-distorted image, thereby facilitating obtaining the first matching point pair.

302: A first image feature of an image area located under the common view area of the first de-distorted image is extracted, and a second image feature of an image area located under the common view area of the second de-distorted image is extracted.

Illustratively, since the first de-distorted image and the second de-distorted image have an image area located under the same common view area, and further for the common view area, the first image feature of the first de-distorted image is extracted, and the second image feature of the second de-distorted image is extracted. The first image feature is, for example, a corner scale invariant feature transform (SIFT) feature and an oriented fast and rotated brief (ORB) feature. The second image feature is, for example, a corner SIFT feature and an ORB feature.

303: Based on the first image feature and the second image feature, the first matching point pair between the image captured by the first camera and the image captured by the second camera is determined.

In an example, step 303 includes: based on the first image feature and the second image feature, feature matching is performed on the first de-distorted image and the second de-distorted image to obtain the first matching point pair.

Illustratively, based on the first image feature and the second image feature, feature matching is performed on the image in the common view area of the first de-distorted image and the image in the common view area of the second de-distorted image to obtain the first matching point pair. The first matching point pair includes N pairs of image points, where each pair of image points includes one image point on the first de-distorted image corresponding to the first camera, and one image point on the second de-distorted image corresponding to the second camera, where N is a positive integer greater than or equal to 1. Each image point in the first matching point pair is a two-dimensional image point.

Since the first camera and the second camera have the common view area, the first de-distorted image has an image in the common view area, and the second de-distorted image has an image in the common view area. Furthermore, for the common view area, feature matching processing is performed on the image in the common view area of the first de-distorted image and the image in the common view area of the second de-distorted image, thus each pair of image points in the obtained first matching point pair is directed to the common view area and facilitates subsequent analysis of the rotation matrix.

304: A first rotation matrix is generated according to the first matching point pair, where the first rotation matrix represents a rotation matrix of the first camera in a second camera coordinate system.

In an example, step 304 includes:
a first step: a fourth rotation matrix is generated according to the first matching point pair, where the fourth rotation matrix represents a rotation matrix of the second camera in an equivalent camera coordinate system;
a second step: a fifth rotation matrix is acquired, where the fifth rotation matrix represents a rotation matrix of the first camera in the equivalent camera coordinate system; and
a third step: the first rotation matrix is generated according to the fourth rotation matrix and the fifth rotation matrix.

In an example, the above second step specifically includes: a first camera coordinate system in which the image captured by the first camera is located is transformed according to a preset pitch angle and a yaw angle, to obtain the fifth rotation matrix.

Illustratively, the first matching point pair may be processed by using epipolar geometry algorithm to obtain a fourth rotation matrix R_tmp, where the fourth rotation matrix R_tmp represents a rotation matrix of the second camera in the equivalent camera coordinate system.

In this case, a fifth rotation matrix R needs to be obtained, where the fifth rotation matrix represents the rotation matrix of the first camera in the equivalent camera coordinate system. In an example, the de-distortion processing of the pitch angle and the yaw angle is performed on the image captured by the first camera, that is, rotational transformation is performed on the first camera coordinate system in which the image captured by the first camera is located according to the pitch angle and the yaw angle, thus the fifth rotation matrix can be obtained. For example, the first camera is a fisheye camera, and the image captured by the fisheye camera is a circular image. De-distortion of a pitch angle (for example, 58 degrees) and a yaw angle (for example, 90 degrees) is performed on the circular image captured by the fisheye camera, and at this time, the fifth rotation matrix R can be obtained (i.e. the fisheye camera coordinate system is rotated according to the pitch angle and the yaw angle, and then a fifth rotation matrix R can be obtained). In this case, the fifth rotation matrix is a rotation matrix of the fisheye camera in the equivalent camera coordinate system, where "the fisheye camera coordinate system" refers to a coordinate system used by an image captured by the fisheye camera, and "the equivalent camera coordinate system" refers to a coordinate system used by an image captured by an equivalent gun-type device. In the above process, according to a preset pitch angle and a preset yaw angle, the first camera coordinate system in which an image captured by the first camera is located is transformed, and the fifth rotation matrix can be obtained accurately.

Then, matrix multiplication processing is performed on the fourth rotation matrix R_tmp and the fifth rotation matrix R to generate the first rotation matrix $A=R*R\_tmp^{-1}$.

In the above process, the fourth rotation matrix represents the rotation matrix of the second camera in the equivalent camera coordinate system, the fifth rotation matrix represents the rotation matrix of the first camera in the equivalent camera coordinate system, and then the first rotation matrix (representing a rotation matrix of the first camera in the second camera coordinate system) can be obtained according to the two matrices.

305: Three-dimensional coordinate information of a mark point is acquired, and two-dimensional coordinate information of the mark point on the image captured by the second camera is determined; and resolution processing is performed on the three-dimensional coordinate information of the mark point and the two-dimensional coordinate information of the mark point on the image captured by the second camera to obtain the second rotation matrix. The second rotation matrix represents a rotation matrix of the second camera in the world coordinate system.

Illustratively, when acquiring the second rotation matrix (the second rotation matrix represents a rotation matrix of the second camera in the world coordinate system), the three-dimensional coordinate information of the mark point can be obtained by a dotting manner of a high-precision map or a manual RTK device. Then, the two-dimensional coordinate information of the mark point on the image is determined through the image captured by the second camera. PNP resolution processing is performed according to the three-dimensional coordinate information of the mark point and the two-dimensional coordinate information of the mark point to obtain the second rotation matrix, where the second rotation matrix represents a rotation matrix of the second camera in the world coordinate system.

In this case, although the second rotation matrix (representing a rotation matrix of the second camera in the world coordinate system) is obtained through the dotting manner of the high-precision map or the manual RTK device, the cost and time are still saved to some extent. The reason is that a third rotation matrix (representing a rotation matrix of the first camera in the world coordinate system) is obtained according to the second rotation matrix (representing a rotation matrix of the second camera in the world coordinate system), that is, there's no need to obtain the third rotation matrix (representing a rotation matrix of the first camera in the world coordinate system) by the dotting manner of the high-precision map or the manual RTK device for the first camera.

306: A third rotation matrix is generated according to the first rotation matrix and the second rotation matrix, where the third rotation matrix represents a rotation matrix of the first camera in the world coordinate system.

Illustratively, matrix multiplication processing is performed on a first rotation matrix A and a second rotation matrix B to obtain a third rotation matrix R_fisheye=A*B, where the third rotation matrix represents a rotation matrix of the first camera in the world coordinate system.

307: According to the third rotation matrix, the two-dimensional perception information of the image captured by the first camera is converted into the world coordinate system to generate three-dimensional perception information of the image captured by the first camera.

Illustratively, when generating the three-dimensional perception information of the image captured by the first camera, since the third rotation matrix represents a rotation matrix of the first camera in the world coordinate system and the perception information of the image captured by the first camera is two-dimensional perception information, the three-dimensional perception information of the image captured by the first camera can be generated through converting the two-dimensional perception information of the image captured by the first camera into the world coordinate system according to the third rotation matrix. That is, the three-dimensional perception information of the image captured by the first camera is obtained quickly and accurately.

308: According to the second rotation matrix, the two-dimensional perception information of the image captured by the second camera is converted into the world coordinate system to generate the three-dimensional perception information of the image captured by the second camera.

In an example, the three-dimensional perception information of the image captured by the first camera is configured to perform three-dimensional perception positioning of an automatic driving vehicle, and the three-dimensional perception information of the image captured by the second camera is configured to perform the three-dimensional perception positioning of the automatic driving vehicle.

In an example, the second rotation matrix is configured to calibrate parameters of the second camera, and the third rotation matrix is configured to calibrate parameters of the first camera.

Illustratively, the second rotation matrix, which represents a rotation matrix of the second camera in the world coordinate system, is also obtained in the above process, and the perception information of the image captured by the second camera is two-dimensional perception information, thus, the three-dimensional perception information of the image captured by the second camera can be generated through converting the two-dimensional perception information of the image captured by the second camera into the world coordinate system according to the second rotation matrix. That is, the three-dimensional perception information of the image captured by the second camera is obtained quickly and accurately.

According to the present embodiment, the three-dimensional perception information of the image captured by the first camera and the three-dimensional perception information of the image captured by the second camera can be generated accurately and quickly. The first camera is a fisheye camera, and the second camera is a rear-view gun camera; or, the first camera is a fisheye camera, and the second camera is a front-view gun camera.

The obtained three-dimensional perception information is used for three-dimensional perception positioning of the automatic driving vehicle. In an example, in the process of automatic driving, the automatic driving vehicle needs to perform three-dimensional perception positioning for the automatic driving according to the three-dimensional perceptual information. Through the present embodiment, the three-dimensional perception information of the fish-eye camera, the three-dimensional perception information of the rear-view gun camera, and the three-dimensional perception information of the front-view gun camera can be obtained, thus the automatic driving vehicle can obtain the three-dimensional perception information, and then perform three-dimensional perception positioning according to the three-dimensional perception information, thereby facilitating the automatic driving of the automatic driving vehicle.

When performing the three-dimensional perception positioning, the automatic driving vehicle can realize the three-dimensional perception positioning according to both a rotation matrix and a translation matrix of the roadside camera in the world coordinate system. In an example, an RTK device may be adopted to perform dotting on each roadside camera (front-view gun camera, rear-view gun camera and fisheye camera) to obtain a translation parameter matrix of each roadside camera in the world coordinate system, where the translation parameter matrix represents a position (namely, a translation) of the roadside camera in the world coordinate system. Then, through the described process in this embodiment, a rotation matrix (including the second rotation matrix representing a rotation matrix of the second camera in the world coordinate system, and the third rotation matrix representing a rotation matrix of the first camera in the world coordinate system, where the first camera is a fisheye camera and the second camera is a rear-view gun camera, or, the first camera is a fisheye camera and the second camera is a front-view gun camera) of each roadside camera in the world coordinate system is obtained, and then the three-dimensional perception information of an image captured by each roadside camera is obtained according to the rotation matrix of each roadside camera in the world coordinate system. After then, the automatic driving vehicle may perform three-dimensional perception positioning according to the translation parameter matrix of each roadside camera in the world coordinate system and the three-dimensional perception information of the image captured by each roadside camera.

In addition, in the present embodiment, the second rotation matrix (representing a rotation matrix of the second camera in the world coordinate system) and the third rotation matrix (representing a rotation matrix of the first camera in the world coordinate system) are obtained. The parameters of the second camera may be calibrated by using the second rotation matrix, and the parameters of the first camera may be calibrated by using the third rotation matrix. Thus, the parameters (namely, external parameters) of the roadside camera can be corrected.

In an example, in case that the roadside camera is slightly rotated due to external force factors such as wind and vibration, the external parameters of the roadside camera need to be recalibrated. Firstly, detect which roadside camera has been moved and which camera has not through an "image stabilization algorithm" or an "image matching detection algorithm". Then, obtain the external parameters of the moved roadside camera according to external parameters of the roadside camera without movement. After that, calibrate the external parameters of the moved roadside camera according to its rotation matrix in the world coordinate system. For example, the first camera is a fisheye camera, and if it is determined that the fisheye camera has been moved, the external parameters of the fisheye camera may be calibrated according to the third rotation matrix (representing a rotation matrix of the first camera in the world coordinate system).

With the above process of this embodiment, the first camera is a fisheye camera, and the second camera is a rear-view gun camera; according to a rotation matrix of the rear-view gun camera in the world coordinate system (namely, the second rotation matrix), a rotation matrix of the fisheye camera in the world coordinate system (namely, the third rotation matrix) can be obtained; and then the three-dimensional perception information of the image captured by the rear-view gun camera and the three-dimensional perception information of the image captured by the fisheye camera can be obtained.

The first camera is a fisheye camera, and the second camera is a front-view gun camera; a rotation matrix of the fisheye camera in the world coordinate system (namely, the third rotation matrix) can be obtained according to a rotation matrix of the front-view gun camera in the world coordinate system (namely, the second rotation matrix); and then the three-dimensional perception information of the image captured by the front-view gun camera and the three-dimensional perception information of the image captured by the fisheye camera can be obtained.

It can be seen that, through the process of this embodiment, the three-dimensional perception information of the image captured by the fisheye camera, the three-dimensional perception information of the image captured by the rear-view gun camera, and the three-dimensional perception information of the image captured by the front-view gun camera can be obtained, and then may be applied to three-dimensional perception positioning of automatic driving or a calibration of external parameters of a roadside camera.

In the present embodiment, the fourth rotation matrix (representing a rotation matrix of the second camera in the equivalent camera coordinate system) is generated according to the first matching point pair between the image captured by the first camera and the image captured by the second camera; the first rotation matrix (representing a rotation matrix of the first camera in the second camera coordinate system) is generated according to the fourth rotation matrix and the fifth rotation matrix (representing a rotation matrix of the first camera in the equivalent camera coordinate system); since the first rotation matrix represents a rotation matrix of the first camera in the second camera coordinate system, and the second rotation matrix represents a rotation matrix of the second camera in the world coordinate system, the third rotation matrix, which represents a rotation matrix of the first camera in the world coordinate system, is obtained therefrom; in case that the rotation matrix of the first camera in the world coordinate system is obtained, the three-dimensional perception information of the image captured by the first camera may be generated through converting the two-dimensional perception information of the image captured by the first camera according to the third rotation matrix; and the three-dimensional perception information of the image captured by the second camera may be generated according to the second rotation matrix. The first camera is a fisheye camera, and the second camera is a front-view gun camera; or the first camera is a fisheye camera, and the second camera is a rear-view gun camera. Thus, the three-dimensional perception information of the image captured by each roadside camera can be obtained. It is unnecessary to adopt a dotting manner of the high-precision map or the manual RTK device, thereby reducing costs, improving efficiency, and ensuring personnel safety. The three-dimensional perception information of the image captured by the fisheye camera, the three-dimensional perception information of the image captured by the rear-view gun camera, and the three-dimensional perception information of the image captured by the front-view gun camera can be obtained, and then may be applied to three-dimensional perception positioning of automatic driving or a calibration of external parameters of a roadside camera.

Figure 5:
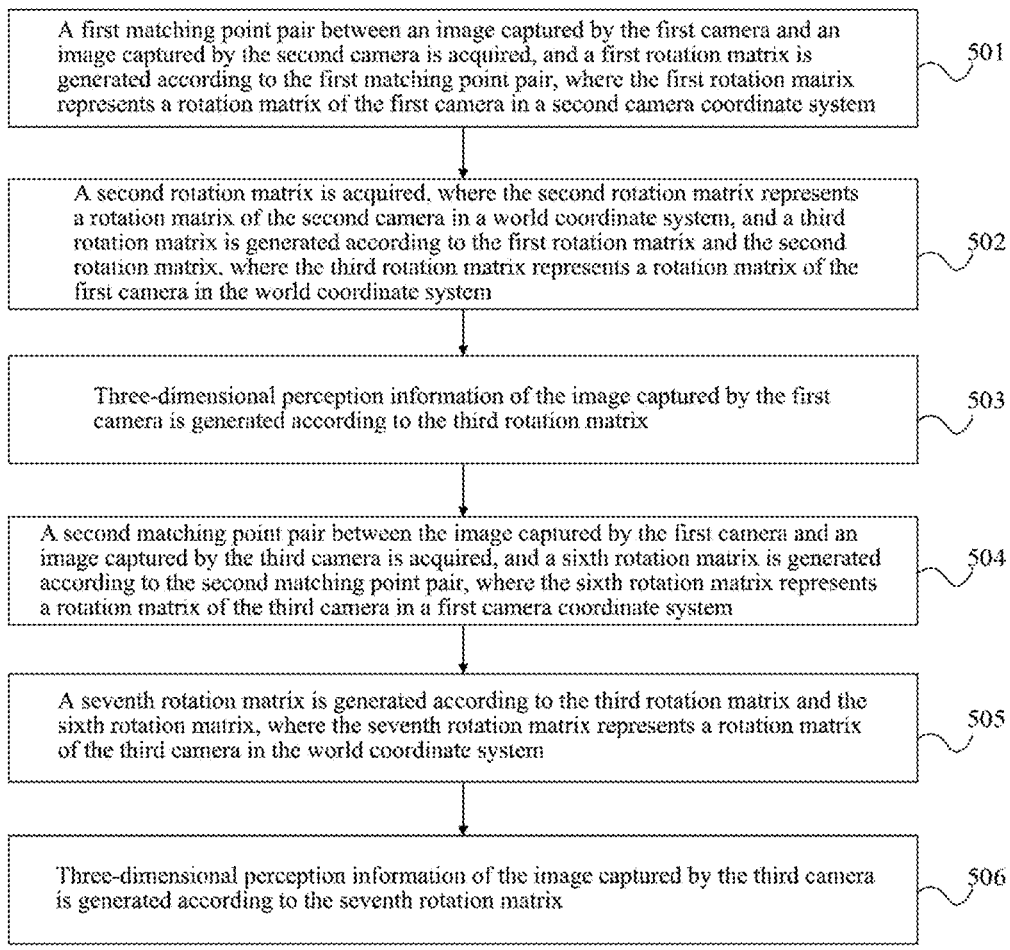
FIG. 5 is a schematic view according to a third embodiment of the present application.

FIG. 5 is a schematic view according to a third embodiment of the present application. As shown in FIG. 5, a method for acquiring three-dimensional perception information based on external parameters of a roadside camera provided in this embodiment includes the following.

501: A first matching point pair between an image captured by the first camera and an image captured by the second camera is acquired, and a first rotation matrix is generated according to the first matching point pair, where the first rotation matrix represents a rotation matrix of the first camera in a second camera coordinate system.

502: A second rotation matrix is acquired, where the second rotation matrix represents a rotation matrix of the second camera in a world coordinate system, and a third rotation matrix is generated according to the first rotation matrix and the second rotation matrix, where the third rotation matrix represents a rotation matrix of the first camera in the world coordinate system.

503: Three-dimensional perception information of the image captured by the first camera is generated according to the third rotation matrix.

Illustratively, the roadside camera in the embodiment includes a first camera, a second camera and a third camera, where a common view area is provided between the first camera and the second camera, and a common view area is provided between the first camera and the third camera. In an example, the first camera is a fisheye camera, the second camera is a rear-view gun camera, and the third camera is a front-view gun camera; or the first camera is a fisheye camera, the second camera is a front-view gun camera, and the third camera is a rear-view gun camera.

The execution entity of the embodiment may be an electronic device, where the electronic device may be a terminal device, a server, or another apparatus or device that may execute the method of the embodiment.

Steps 501-503 are executed, and the third rotation matrix (representing a rotation matrix of the first camera in the world coordinate system) can be obtained according to the second rotation matrix (representing a rotation matrix of the second camera in the world coordinate system). For this process, reference may be made to any one of the foregoing embodiments, and details are not described herein again.

504: A second matching point pair between the image captured by the first camera and an image captured by the third camera is acquired, and a sixth rotation matrix is generated according to the second matching point pair, where the sixth rotation matrix represents a rotation matrix of the third camera in a first camera coordinate system.

Illustratively, after step 503, since the first camera and the third camera have the common view area, the second matching point pair between the common view area in the image captured by the first camera and the common view area in the image captured by the third camera can be generated for the common view area. The second matching point pair includes N pairs of image points, where each pair of image points includes one image point on a de-distorted image corresponding to the first camera and one image point on a de-distorted image corresponding to the third camera, where N is a positive integer greater than or equal to 1. Each image point in the second matching point pair is a two-dimensional image point.

Then, the second matching point pair may be processed by using epipolar geometry algorithm to obtain the sixth rotation matrix, where the sixth rotation matrix represents a rotation matrix of the third camera in the first camera coordinate system.

505: A seventh rotation matrix is generated according to the third rotation matrix and the sixth rotation matrix, where the seventh rotation matrix represents a rotation matrix of the third camera in the world coordinate system.

Illustratively, since the third rotation matrix representing a rotation matrix of the first camera in the world coordinate system has been generated, the seventh rotation matrix, which represents a rotation matrix of the third camera in the world coordinate system, can be obtained through performing matrix multiplication processing on the third rotation matrix and the sixth rotation matrix.

506: Three-dimensional perception information of the image captured by the third camera is generated according to the seventh rotation matrix.

Illustratively, since the image captured by the third camera includes two-dimensional perception information, and the seventh rotation matrix represents a rotation matrix of the third camera in the world coordinate system, the three-dimensional perception information of the image captured by the third camera can be obtained through converting the two-dimensional perception information of the image captured by the third camera into the world coordinate system according to the seventh rotation matrix.

The two-dimensional perception information refers to pixel coordinates of an object in a two-dimensional image. In an example, the two-dimensional perception information may be two-dimensional perception information of an object in an image, where the object includes, but is not limited to, a motor vehicle, a non-motor vehicle, a pedestrian, a lane line, and the like.

In an example, the first camera is a fisheye camera, the second camera is a rear-view gun camera, and the third camera is a front-view gun camera; according to a rotation matrix of the rear-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the front-view camera in the world coordinate system (namely, the seventh rotation matrix) can be obtained.

In another example, the first camera is a fisheye camera, the second camera is a front-view gun camera, and the third camera is a rear-view gun camera; according to a rotation matrix of the front-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the rear-view camera in the world coordinate system (namely, the seventh rotation matrix) can be obtained.

In the present embodiment, after the third rotation matrix (representing a rotation matrix of the first camera in the world coordinate system) is obtained, the seventh rotation matrix is obtained according to the third rotation matrix and the sixth rotation matrix (representing a rotation matrix of the third camera in the first camera coordinate system), where the seventh rotation matrix represents a rotation matrix of the third camera in the world coordinate system. Thus, according to the second rotation matrix (representing a rotation matrix of the second camera in the world coordinate system), the third rotation matrix (representing a rotation matrix of the first camera in the world coordinate system) and the seventh rotation matrix (representing a rotation matrix of the third camera in the world coordinate system) can be obtained in turn. Thus, according to a rotation matrix of one roadside camera in the world coordinate system, rotation matrices of the other two roadside cameras in the world coordinate system are obtained. Then, the three-dimensional perception information of the image captured by each roadside camera can be obtained. It is unnecessary to adopt a dotting manner of the high-precision map or the manual RTK device for each roadside camera to obtain a rotation matrix of the roadside camera in the world coordinate system. Furthermore, it is effective and fast to obtain the rotation matrix of each roadside camera in the world coordinate system, thus it is convenient to obtain the three-dimensional perception information of the image captured by each roadside camera.

Figure 6:
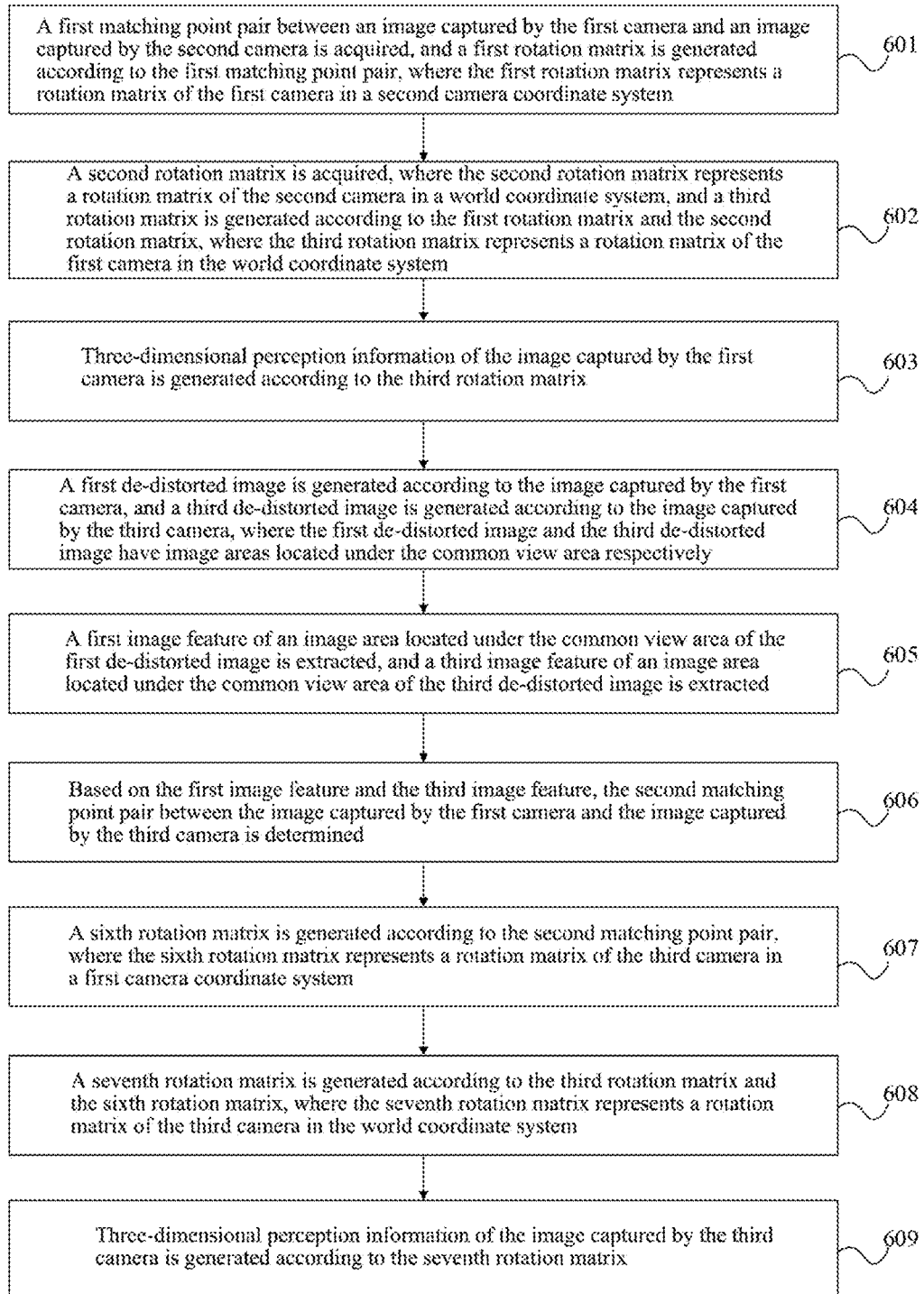
FIG. 6 is a schematic view according to a fourth embodiment of the present application.

FIG. 6 is a schematic view according to a fourth embodiment of the present application. As shown in FIG. 6, a method for acquiring three-dimensional perception information based on external parameters of a roadside camera provided in this embodiment includes the following.

601: A first matching point pair between an image captured by the first camera and an image captured by the second camera is acquired, and a first rotation matrix is generated according to the first matching point pair, where the first rotation matrix represents a rotation matrix of the first camera in a second camera coordinate system.

602: A second rotation matrix is acquired, where the second rotation matrix represents a rotation matrix of the second camera in a world coordinate system, and a third rotation matrix is generated according to the first rotation matrix and the second rotation matrix, where the third rotation matrix represents a rotation matrix of the first camera in the world coordinate system.

603: Three-dimensional perception information of the image captured by the first camera is generated according to the third rotation matrix.

In an example, if the first camera is a fisheye camera and the second camera is a rear-view gun camera, then the third camera is a front-view gun camera; if the first camera is a fisheye camera and the second camera is a front-view gun camera, then the third camera is a rear-view gun camera.

Illustratively, the roadside camera in the embodiment includes a first camera, a second camera and a third camera, where a common view area is provided between the first camera and the second camera, and a common view area is provided between the first camera and the third camera (the common view area between the first camera and the second camera is different from the common view area between the first camera and the third camera). In an example, the first camera is a fisheye camera, the second camera is a rear-view gun camera, and the third camera is a front-view gun camera; or the first camera is a fisheye camera, the second camera is a front-view gun camera, and the third camera is a rear-view gun camera.

The execution entity of the embodiment may be an electronic device, where the electronic device may be a terminal device, a server, or another apparatus or device that may execute the method of the embodiment.

Steps 601-603 are executed, and the third rotation matrix (representing a rotation matrix of the first camera in the world coordinate system) can be obtained according to the second rotation matrix (representing a rotation matrix of the second camera in the world coordinate system). For this process, reference may be made to any one of the foregoing embodiments, and details are not described herein again.

604: A first de-distorted image is generated according to the image captured by the first camera, and a third de-distorted image is generated according to the image captured by the third camera, where the first de-distorted image and the third de-distorted image have image areas located under the common view area respectively.

In an example, the third de-distorted image is generated according to the image captured by the third camera of step 604 includes: the image captured by the third camera is adjusted by using a de-distortion function to obtain the third de-distorted image.

Illustratively, the first camera and the third camera have the common view area, and the first de-distorted image has been obtained in the described embodiment, it is also necessary to generate the third de-distorted image according to the image captured by the third camera. In an example, since the first camera and the third camera have the common view area (i.e. images for the same area can be captured), thus the first de-distorted image and the third de-distorted image have image areas located under the common view area respectively.

The image captured by the third camera also has a certain distortion problem. The image captured by the third camera may be adjusted to obtain the third de-distorted image of the third camera. In an example, a de-distortion function in opencv may be adopted to adjust the image captured by the third camera to obtain the third de-distorted image.

For example, the first camera is a fisheye camera, the second camera is a rear-view gun camera, and the third is a front-view gun camera. An opencv de-distortion function may be adopted to perform de-distortion processing on the image captured by the front-view gun camera to obtain the third de-distorted image of the rear-view gun camera.

Through the above manner, the image captured by the third camera can be adjusted to obtain the third de-distorted image, which in turn facilitates the obtaining of the second matching point pair.

605: A first image feature of an image area located under the common view area of the first de-distorted image is extracted, and a third image feature of an image area located under the common view area of the third de-distorted image is extracted.

Illustratively, since the first de-distorted image and the third de-distorted image have an image area located under the same common view area, for the common view area, the first image feature of the first de-distorted image is extracted, and the third image feature of the third de-distorted image is extracted. The first image feature is, for example, an SIFT feature and an ORB feature. The third image feature is, for example, a corner SIFT feature and an ORB feature.

606: Based on the first image feature and the third image feature, the second matching point pair between the image captured by the first camera and the image captured by the third camera is determined.

In an example, step 606 includes the following steps: based on the first image feature and the third image feature, feature matching is performed on the first de-distorted image and the third de-distorted image to obtain the second matching point pair.

Illustratively, based on the first image feature and the third image feature, feature matching is performed on the image in the common view area of the first de-distorted image and the image in the common view area of the third de-distorted image to obtain the second matching point pair. The second matching point pair includes N pairs of image points, where each pair of image points includes one image point on the first de-distorted image corresponding to the first camera, and one image point on the third de-distorted image corresponding to the third camera, where N is a positive integer greater than or equal to 1. Each image point in the second matching point pair is a two-dimensional image point.

Since the first camera and the third camera have the common view area, the first de-distorted image has an image in the common view area, and the third de-distorted image has an image in the common view area. Furthermore, for the common view area, feature matching processing is performed on the image in the common view area of the first de-distorted image and the image in the common view area of the third de-distorted image, thus each pair of image points in the obtained second matching point pair is directed to the common view area and facilitates subsequent analysis of the rotation matrix.

607: A sixth rotation matrix is generated according to the second matching point pair, where the sixth rotation matrix represents a rotation matrix of the third camera in a first camera coordinate system.

In an example, step 607 includes: an eighth rotation matrix is generated according to the second matching point pair, where the eighth rotation matrix represents a rotation matrix of the third camera in an equivalent camera coordinate system; and a fifth rotation matrix is acquired, where the fifth rotation matrix represents a rotation matrix of the first camera in the equivalent camera coordinate system, and a sixth rotation matrix is generated according to the fifth rotation matrix and the eighth rotation matrix.

Illustratively, the second matching point pair may be processed by using epipolar geometry algorithm to obtain an eighth rotation matrix M, where the eighth rotation matrix M represents a rotation matrix of the third camera in the equivalent camera coordinate system.

Step 304 of the foregoing embodiment may be adopted to obtain the fifth rotation matrix R, where the fifth rotation matrix represents a rotation matrix of the first camera in the equivalent camera coordinate system. Then, the sixth rotation matrix $P=R*M^{-1}$ is generated according to the fifth rotation matrix R and the eighth rotation matrix M.

In the above process, the eighth rotation matrix represents a rotation matrix of the third camera in the equivalent camera coordinate system, the fifth rotation matrix represents a rotation matrix of the first camera in the equivalent camera coordinate system, and then the sixth rotation matrix (representing a rotation matrix of the third camera in the first camera coordinate system) can be obtained according to the two matrices.

608: A seventh rotation matrix is generated according to the third rotation matrix and the sixth rotation matrix, where the seventh rotation matrix represents a rotation matrix of the third camera in the world coordinate system.

Illustratively, the third rotation matrix has been obtained in step 602, and then matrix multiplication processing can be performed on the third rotation matrix K and the sixth rotation matrix P to obtain the seventh rotation matrix $Q=K*P$, where the seventh rotation matrix represents a rotation matrix of the third camera in the world coordinate system.

609: Three-dimensional perception information of the image captured by the third camera is generated according to the seventh rotation matrix.

In an example, the three-dimensional perception information of the image captured by the third camera is used for three-dimensional perception positioning of an automatic driving vehicle. The seventh rotation matrix is used for calibrating parameters of the third camera.

Illustratively, when generating the three-dimensional perception information of the image captured by the third camera, since the seventh rotation matrix represents a rotation matrix of the third camera in the world coordinate system, and the perception information of the image captured by the third camera is two-dimensional perception information, the three-dimensional perception information of the image captured by the third camera can be generated through converting the two-dimensional perception information of the image captured by the third camera into the world coordinate system according to the seventh rotation matrix. That is, the three-dimensional perception information of the image captured by the third camera is obtained quickly and accurately.

In an example, the first camera is a fisheye camera, the second camera is a rear-view gun camera, and the second camera is a front-view gun camera; according to a rotation matrix of the rear-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the front-view gun camera in the world coordinate system (namely, the seventh rotation matrix) is obtained.

In another example, the first camera is a fisheye camera, the second camera is a front-view gun camera, and the third camera is a rear-view gun camera; according to a rotation matrix of the front-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the rear-view gun camera in the world coordinate system (namely, the seventh rotation matrix) is obtained.

The obtained three-dimensional perception information is used for three-dimensional perception positioning of the automatic driving vehicle. In an example, in the process of automatic driving, the automatic driving vehicle needs to perform three-dimensional perception positioning for the automatic driving according to the three-dimensional perceptual information. Through the present embodiment, the three-dimensional perception information of the fish-eye camera, the three-dimensional perception information of the rear-view gun camera, and the three-dimensional perception information of the front-view gun camera can be obtained, thus the automatic driving vehicle can obtain the three-dimensional perception information, and then perform three-dimensional perception positioning according to the three-dimensional perception information, thereby facilitating the automatic driving of the automatic driving vehicle.

In addition, in the present embodiment, the seventh rotation matrix (representing a rotation matrix of the third camera in the world coordinate system) is further obtained. The parameters of the third camera may be calibrated by using the seventh rotation matrix, thus, the parameters (namely, external parameters) of the roadside camera can be corrected.

In an example, in case that the roadside camera is slightly rotated due to external force factors such as wind and vibration, the external parameters of the roadside camera need to be recalibrated. Firstly, detect which roadside camera has been moved and which camera has not through an "image stabilization algorithm" or an "image matching detection algorithm". Then, obtain the external parameters of the moved roadside camera according to external parameters of the roadside camera without movement. After that, calibrate the external parameters of the moved roadside camera according to its rotation matrix in the world coordinate system. For example, the third camera is a front-view gun camera, and if it is determined that the front-view gun camera has been moved, the external parameters of the front-view gun camera may be calibrated according to the seventh rotation matrix (representing a rotation matrix of the third camera in the world coordinate system).

In this embodiment, the first camera is a fisheye camera, the second camera is a rear-view gun camera, and the third camera is a front-view gun camera; according to a rotation matrix of the rear-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the front-view gun camera in the world coordinate system (namely, the seventh rotation matrix) can be obtained. The first camera is a fisheye camera, the second camera is a front-view gun camera, and the third camera is a rear-view gun camera; according to a rotation matrix of the front-view gun camera in the world coordinate system (namely, the second rotation matrix), a rotation matrix of the fisheye camera in the world coordinate system (namely, the third rotation matrix) can be obtained; and then, according to the rotation matrix of the fisheye camera in the world coordinate system (namely, the third rotation matrix), a rotation matrix of the rear-view gun camera in the world coordinate system (namely, the seventh rotation matrix) is obtained. Thus, the three-dimensional perception information of the image captured by each roadside camera can be obtained. It is unnecessary to adopt a dotting manner of the high-precision map or the manual RTK device, thereby reducing costs, improving efficiency, and ensuring personnel safety. The three-dimensional perception information of the image captured by the fisheye camera, the three-dimensional perception information of the image captured by the rear-view gun camera, and the three-dimensional perception information of the image captured by the front-view gun camera can be obtained, and then may be applied to three-dimensional perception positioning of automatic driving or a calibration of external parameters of a roadside camera.

Figure 7:
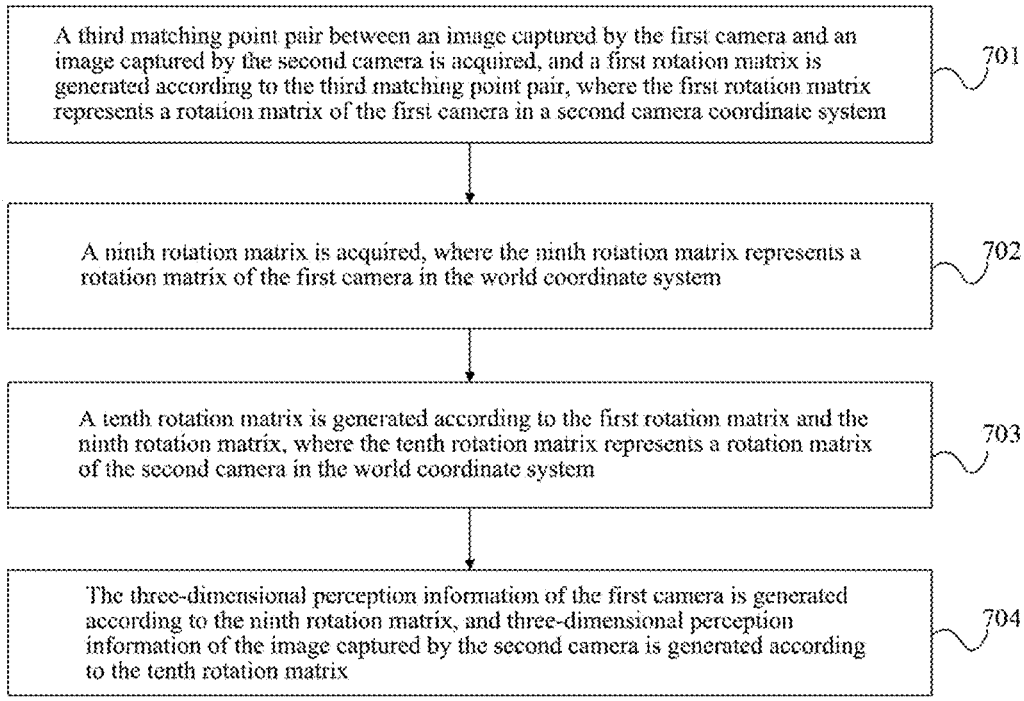
FIG. 7 is a schematic view according to a fifth embodiment of the present application.

FIG. 7 is a schematic view according to a fifth embodiment of the present application. As shown in FIG. 7, a method for acquiring three-dimensional perception information based on external parameters of a roadside camera provided in this embodiment includes the following.

701: A third matching point pair between an image captured by the first camera and an image captured by the second camera is acquired, and a first rotation matrix is generated according to the third matching point pair, where the first rotation matrix represents a rotation matrix of the first camera in a second camera coordinate system.

Illustratively, the execution entity of the embodiment may be an electronic device, where the electronic device may be a terminal device, a server, or another apparatus or device that may execute the method of the embodiment.

Steps 701-704 provided in this embodiment can be performed on the basis of the first embodiment or the second embodiment, or can be performed separately.

In steps 701-704, the first camera is a fisheye camera, and the second camera is a rear-view gun camera or a front-view gun camera.

Since the first camera and the third camera have a common view area, for the common view area, the third matching point pair between the common view area in the image captured by the first camera and the common view area in the image captured by the second camera can be generated. The third matching point pair includes N pairs of image points, where each pair of image points includes one image point on a de-distorted image corresponding to the first camera and one image point on a de-distorted image corresponding to the second camera, where N is a positive integer greater than or equal to 1. Each image point in the third matching point pair is a two-dimensional image point.

Then, the third matching point pair may be processed by using epipolar geometry algorithm to obtain the first rotation matrix, where the first rotation matrix represents a rotation matrix of the first camera in the second camera coordinate system.

In an example, a first de-distorted image may be generated according to the image captured by the first camera, and a second de-distorted image may be generated according to the image captured by the second camera, where the first de-distorted image and the second de-distorted image have an image area located under the common view area respectively. Then, the first image feature of the image area located under the common view area of the first de-distorted image is extracted, and the second image feature of the image area located under the common view area of the second de-distorted image is extracted. Based on the first image feature and the second image feature, feature matching processing is performed on the image located under the common view area of the first de-distorted image and the image located under the common view area of the second de-distorted image to obtain the third matching point pair. In this embodiment, the third matching point pair may be the same as the first matching point pair.

Then, a fourth rotation matrix is generated according to the third matching point pair, where the fourth rotation matrix represents a rotation matrix of the second camera in an equivalent camera coordinate system. A fifth rotation matrix is obtained, where the fifth rotation matrix represents a rotation matrix of the first camera in the equivalent camera coordinate system. The first rotation matrix is generated according to the fourth rotation matrix and the fifth rotation matrix. For this process, reference may be made to step 304 in the foregoing embodiment, and details are not described herein again.

702: A ninth rotation matrix is acquired, where the ninth rotation matrix represents a rotation matrix of the first camera in the world coordinate system.

In an example, step 702 includes the following steps: three-dimensional coordinate information of a mark point is acquired, and two-dimensional coordinate information of the mark point on the image captured by the first camera is determined according to the image captured by the first camera; resolution processing is performed on the three-dimensional coordinate information of the mark point and the two-dimensional coordinate information of the mark point on the image captured by the first camera to obtain the ninth rotation matrix.

Illustratively, the ninth rotation matrix may be obtained through a dotting manner of a high-precision map or an RTK device, where the ninth rotation matrix represents a rotation matrix of the first camera in the world coordinate system.

In an example, when the ninth rotation matrix (representing a rotation matrix of the first camera in the world coordinate system) is acquired, the three-dimensional coordinate information of the mark point may be obtained by the dotting manner of the high-precision map or a manual RTK device. Then, the two-dimensional coordinate information of the mark point on the image is determined through the image captured by the first camera. PNP resolution processing is performed according to the three-dimensional coordinate information of the mark point and the two-dimensional coordinate information of the mark point on the image captured by the first camera to obtain the ninth rotation matrix, where the ninth rotation matrix represents a rotation matrix of the first camera in the world coordinate system.

In this case, although the ninth rotation matrix (representing a rotation matrix of the first camera in the world coordinate system) is obtained through the dotting manner of the high-precision map or the manual RTK device, the cost and time are still saved to some extent. The reason is that a tenth rotation matrix representing a rotation matrix of the second camera in the world coordinate system) is obtained according to the ninth rotation matrix (representing a rotation matrix of the first camera in the world coordinate system), that is, there's no need to obtain the tenth rotation matrix (representing a rotation matrix of the second camera in the world coordinate system) by the dotting manner of the high-precision map or the manual RTK device for the second camera.

703: A tenth rotation matrix is generated according to the first rotation matrix and the ninth rotation matrix, where the tenth rotation matrix represents a rotation matrix of the second camera in the world coordinate system.

Illustratively, matrix multiplication processing is performed on the first rotation matrix and the ninth rotation matrix to obtain the tenth rotation matrix, where the tenth rotation matrix represents a rotation matrix of the second camera in the world coordinate system.

704: The three-dimensional perception information of the first camera is generated according to the ninth rotation matrix, and three-dimensional perception information of the image captured by the second camera is generated according to the tenth rotation matrix.

In an example, the ninth rotation matrix is configured to calibrate parameters of the first camera, and the tenth rotation matrix is configured to calibrate parameters of the second camera.

Illustratively, since the ninth rotation matrix represents a rotation matrix of the first camera in the world coordinate system, and the perception information of the image captured by the first camera is two-dimensional perception information, the three-dimensional perception information of the image captured by the first camera can be generated through converting the two-dimensional perception information of the image captured by the first camera into the world coordinate system according to the ninth rotation matrix. That is, the three-dimensional perception information of the image captured by the first camera is obtained quickly and accurately.

Moreover, since the tenth rotation matrix represents a rotation matrix of the second camera in the world coordinate system, and the perception information of the image captured by the second camera is two-dimensional perception information, the three-dimensional perception information of the image captured by the second camera can be generated through converting the two-dimensional perception information of the image captured by the second camera into the world coordinate system according to the tenth rotation matrix. That is, the three-dimensional perception information of the image captured by the second camera is obtained quickly and accurately. Each of the three-dimensional perception information may be used for an automatic driving vehicle to perform three-dimensional perception positioning.

Furthermore, in the present embodiment, the ninth rotation matrix (representing a rotation matrix of the first camera in the world coordinate system) and the tenth rotation matrix (representing a rotation matrix of the second camera in the world coordinate system) are further obtained. The parameters of the first camera may be calibrated by using the ninth rotation matrix, and the parameters of the second camera may be calibrated by using the tenth rotation matrix. Thus, the parameters (namely, external parameters) of the roadside camera can be corrected.

With the above process of this embodiment, the first camera is a fisheye camera, and the second camera is a rear-view gun camera; according to a rotation matrix of the fisheye camera in the world coordinate system (namely, the ninth rotation matrix), a rotation matrix of the rear-view gun camera in the world coordinate system (namely, the tenth rotation matrix) can be obtained. The first camera is a fisheye camera, and the second camera is a front-view gun camera; according to a rotation matrix of the fisheye camera in the world coordinate system (namely, the ninth rotation matrix), a rotation matrix of the front-view gun camera in the world coordinate system (namely, the tenth rotation matrix) can be obtained.

In the present embodiment, the first rotation matrix (representing a rotation matrix of the first camera in the second camera coordinate system) is generated according to the third matching point pair between the image captured by the first camera and the image captured by the second camera, and the tenth rotation matrix (representing a rotation matrix of the second camera in the world coordinate system) is generated according to the first rotation matrix and the ninth rotation matrix (representing a rotation matrix of the first camera in the world coordinate system). Thus, the three-dimensional perception information of the first camera may be generated according to the ninth rotation matrix, and the three-dimensional perception information of the image captured by the second camera may be generated according to the tenth rotation matrix. The first camera is a fisheye camera, and the second camera is a rear-view gun camera; according to the rotation matrix of the fisheye camera in the world coordinate system (namely, the ninth rotation matrix), the rotation matrix of the rear-view gun camera in the world coordinate system (namely, the tenth rotation matrix) can be obtained. The first camera is a fisheye camera, and the second camera is a front-view gun camera; according to the rotation matrix of the fisheye camera in the world coordinate system (namely, the ninth rotation matrix), the rotation matrix of the front-view gun camera in the world coordinate system (namely, the tenth rotation matrix) can be obtained. Thus, the three-dimensional perception information of the image captured by each roadside camera can be obtained. It is unnecessary to adopt a dotting manner of the high-precision map or the manual RTK device, thereby reducing costs, improving efficiency, and ensuring personnel safety.

The three-dimensional perception information of the image captured by the fisheye camera, the three-dimensional perception information of the image captured by the rear-view gun camera, and the three-dimensional perception information of the image captured by the front-view gun camera can be obtained, and then may be applied to the three-dimensional perception positioning of automatic driving or a calibration of external parameters of a roadside camera.

Figure 8:
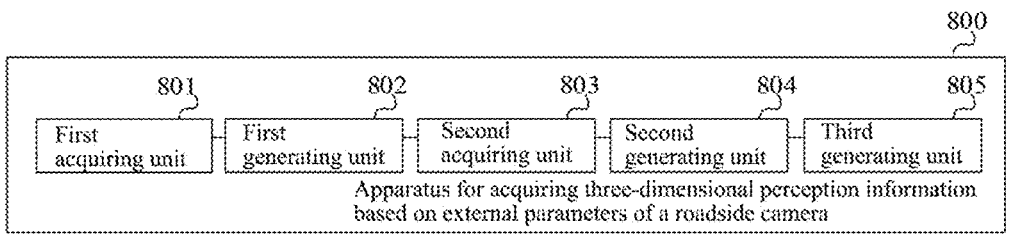
FIG. 8 is a schematic view according to a sixth embodiment of the present application.

FIG. 8 is a schematic view according to a sixth embodiment of the present application. As shown in FIG. 8, the embodiment provides an apparatus 800 for acquiring three-dimensional perception information based on external parameters of a roadside camera, where the roadside camera includes a first camera and a second camera having a common view area, where the apparatus 800 includes:

a first acquiring unit 801 configured to acquire a first matching point pair between an image captured by the first camera and an image captured by the second camera;

a first generating unit 802 configured to generate a first rotation matrix according to the first matching point pair, where the first rotation matrix represents a rotation matrix of the first camera in a second camera coordinate system;

a second acquiring unit 803 configured to acquire a second rotation matrix, where the second rotation matrix represents a rotation matrix of the second camera in a world coordinate system;

a second generating unit 804 configured to generate a third rotation matrix according to the first rotation matrix and the second rotation matrix, where the third rotation matrix represents a rotation matrix of the first camera in the world coordinate system; and a third generating unit 805 configured to generate three-dimensional perception information of the image captured by the first camera according to the third rotation matrix.

The apparatus in the embodiment may execute the technical solutions in the foregoing method, and the specific implementation process and the technical principles are the same, which are not described herein again.

Figure 9:
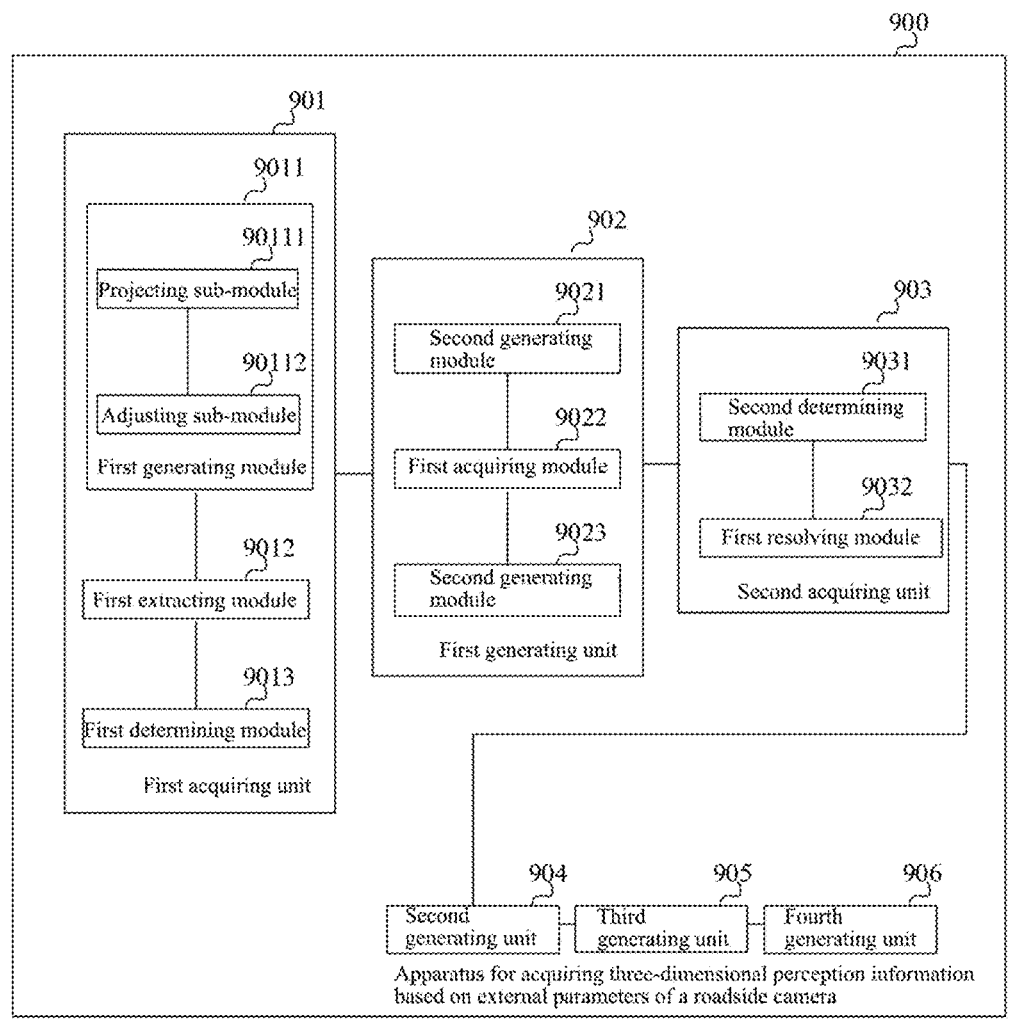
FIG. 9 is a schematic view according to a seventh embodiment of the present application.

FIG. 9 is a schematic view according to a seventh embodiment of the present application. As shown in FIG. 9, the embodiment provides an apparatus 900 for acquiring three-dimensional perception information based on external parameters of a roadside camera, where the roadside camera includes a first camera and a second camera having a common view area, where the apparatus 900 includes:

a first acquiring unit 901 configured to acquire a first matching point pair between an image captured by the first camera and an image captured by the second camera;

a first generating unit 902 configured to generate a first rotation matrix according to the first matching point pair, where the first rotation matrix represents a rotation matrix of the first camera in a second camera coordinate system;

a second acquiring unit 903 configured to acquire a second rotation matrix, where the second rotation matrix represents a rotation matrix of the second camera in a world coordinate system;

a second generating unit 904 configured to generate a third rotation matrix according to the first rotation matrix and the second rotation matrix, where the third rotation matrix represents a rotation matrix of the first camera in the world coordinate system; and a third generating unit 905 configured to generate three-dimensional perception information of the image captured by the first camera according to the third rotation matrix.

In an example, the first acquiring unit 901 includes:

a first generating module 9011 configured to generate a first de-distorted image according to the image captured by the first camera, and generate a second de-distorted image according to the image captured by the second camera, where the first de-distorted image and the second de-distorted image have image areas located under the common view area respectively;

a first extracting module 9012 configured to extract a first image feature of an image area located under the common view area of the first de-distorted image, and extract a second image feature of an image area located under the common view area of the second de-distorted image; and a first determining module 9013 configured to determine, based on the first image feature and the second image feature, the first matching point pair between the image captured by the first camera and the image captured by the second camera.

In an example, the first determining module 9013 is specifically configured to: perform, based on the first image feature and the second image feature, feature matching on the first de-distorted image and the second de-distorted image to obtain the first matching point pair.

In an example, the first generating module 9011 includes:

a projecting sub-module 90111 configured to project the image captured by the first camera on a spherical surface to obtain a spherical image, and perform de-distortion processing on the spherical image to obtain the first de-distorted image; and an adjusting sub-module 90112 configured to adjust the image captured by the second camera by using a de-distortion function to obtain the second de-distorted image.

In an example, the first generating unit 902 includes:

a second generating module 9021 configured to generate a fourth rotation matrix according to the first matching point pair, where the fourth rotation matrix represents a rotation matrix of the second camera in an equivalent camera coordinate system;

a first acquiring module 9022 configured to acquire a fifth rotation matrix, where the fifth rotation matrix represents a rotation matrix of the first camera in the equivalent camera coordinate system; and the second generating module 9023 configured to generate the first rotation matrix according to the fourth rotation matrix and the fifth rotation matrix.

In an example, the first acquiring module 9022 is specifically configured to: transform a first camera coordinate system in which the image captured by the first camera is located according to a preset pitch angle and a yaw angle, to obtain the fifth rotation matrix.

In an example, the second acquiring unit 903 includes:

a second determining module 9031 configured to acquire three-dimensional coordinate information of a mark point, and determine two-dimensional coordinate information of the mark point on the image captured by the second camera according to the image captured by the second camera; and a first resolving module 9032 configured to perform resolution processing on the three-dimensional coordinate information of the mark point and the two-dimensional coordinate information of the mark point on the image captured by the second camera to obtain the second rotation matrix.

In an example, the third generating unit 905 is specifically configured to: convert, according to the third rotation matrix, two-dimensional perception information in the image captured by the first camera into the world coordinate system to generate the three-dimensional perception information of the image captured by the first camera.

In an example, the apparatus 900 provided in the embodiment further includes:

a fourth generating unit 906 configured to convert, according to the second rotation matrix, two-dimensional perception information of the image captured by the second camera into the world coordinate system to generate the three-dimensional perception information of the image captured by the second camera.

In an example, the three-dimensional perception information is used for three-dimensional perception positioning of an automatic driving vehicle.

In an example, the second rotation matrix is configured to calibrate parameters of the second camera, and the third rotation matrix is configured to calibrate parameters of the first camera.

In an example, the first camera is a fisheye camera, and the second camera is a rear-view gun camera; or the first camera is a fisheye camera, and the second camera is a front-view gun camera.

The apparatus in the embodiment may execute the technical solutions in the foregoing method, and the specific implementation process and the technical principles are the same, which are not described herein again.

Figure 10:
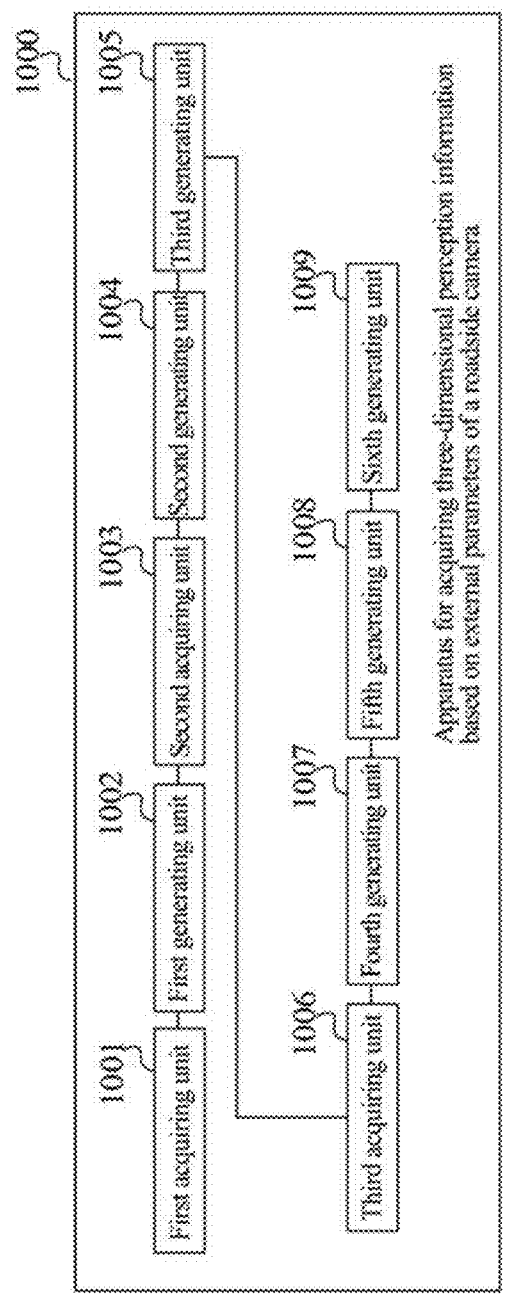
FIG. 10 is a schematic view according to an eighth embodiment of the present application.

FIG. 10 is a schematic view according to an eighth embodiment of the present application. As shown in FIG. 10, the embodiment provides an apparatus 1000 for acquiring three-dimensional perception information based on external parameters of a roadside camera, where the roadside camera includes a first camera and a second camera having a common view area, where the apparatus 1000 includes:

a first acquiring unit 1001 configured to acquire a first matching point pair between an image captured by the first camera and an image captured by the second camera;

a first generating unit 1002 configured to generate a first rotation matrix according to the first matching point pair, where the first rotation matrix represents a rotation matrix of the first camera in a second camera coordinate system;

a second acquiring unit 1003 configured to acquire a second rotation matrix, where the second rotation matrix represents a rotation matrix of the second camera in a world coordinate system;

a second generating unit 1004 configured to generate a third rotation matrix according to the first rotation matrix and the second rotation matrix, where the third rotation matrix represents a rotation matrix of the first camera in the world coordinate system; and a third generating unit 1005 configured to generate three-dimensional perception information of the image captured by the first camera according to the third rotation matrix.

In an example, the roadside camera further includes a third camera having a common view area with the first camera; and the apparatus 1000 provided in the embodiment further includes:

a third acquiring unit 1006 configured to acquire, after the three-dimensional perception information of the image captured by the first camera is generated by the third generating unit according to the third rotation matrix, a second matching point pair between the image captured by the first camera and the image captured by the third camera;

a fourth generating unit 1007 configured to generate a sixth rotation matrix according to the second matching point pair, where the sixth rotation matrix represents a rotation matrix of the third camera in a first camera coordinate system;

a fifth generating unit 1008 configured to generate a seventh rotation matrix according to the third rotation matrix and the sixth rotation matrix, where the seventh rotation matrix represents a rotation matrix of the third camera in the world coordinate system; and a sixth generating unit 1009 configured to generate three-dimensional perception information of the image captured by the third camera according to the seventh rotation matrix.

In an example, the third acquiring unit 1006 includes:

a third generating module configured to generate a first de-distorted image according to the image captured by the first camera, and generate a third de-distorted image according to the image captured by the third camera, where the first de-distorted image and the third de-distorted image have image areas located under the common view area respectively;

a second extracting module configured to extract a first image feature of an image area located under the common view area of the first de-distorted image, and extract a third image feature of an image area located under the common view area of the third de-distorted image; and a third determining module configured to determine, based on the first image feature and the third image feature, the second matching point pair between the image captured by the first camera and the image captured by the third camera.

In an example, the third determining module is specifically configured to: perform, based on the first image feature and the third image feature, feature matching on the first de-distorted image and the third de-distorted image to obtain the second matching point pair.

In an example, when generating the third de-distorted image according to the image captured by the third camera, the third generating module is specifically configured to: adjust the image captured by the third camera by using a de-distortion function to obtain the third de-distorted image.

In an example, the fifth generating unit 1008 includes:

a fourth generating module configured to generate an eighth rotation matrix according to the second matching point pair, where the eighth rotation matrix represents a rotation matrix of the third camera in an equivalent camera coordinate system;

a second acquiring module configured to acquire a fifth rotation matrix, where the fifth rotation matrix represents a rotation matrix of the first camera in the equivalent camera coordinate system; and a fifth generating module configured to generate the sixth rotation matrix according to the fifth rotation matrix and the eighth rotation matrix.

In an example, if the first camera is a fisheye camera and the second camera is a rear-view gun camera, the third camera is a front-view gun camera; and if the first camera is a fisheye camera and the second camera is a front-view gun camera, the third camera is a rear-view gun camera.

In an example, the three-dimensional perception information of the image captured by the third camera is used for three-dimensional perception positioning of an automatic driving vehicle; and the seventh rotation matrix is configured to calibrate parameters of the third camera.

The apparatus in the embodiment may execute the technical solutions in the foregoing method, and the specific implementation process and the technical principles are the same, which are not described herein again.

Figure 11:
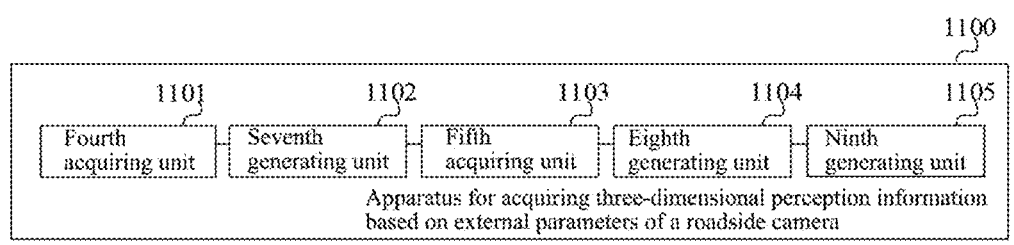
FIG. 11 is a schematic view according to a ninth embodiment of the present application.

FIG. 11 is a schematic view according to a ninth embodiment of the present application. As shown in FIG. 11, the embodiment provides an apparatus 1100 for acquiring three-dimensional perception information based on external parameters of a roadside camera, where the roadside camera includes a first camera and a second camera having a common view area, where the apparatus 1100 includes the following.

Firstly, the apparatus 1100 provided in the embodiment may include various units and modules of FIG. 8 or FIG. 9, or may not include various units and modules of FIG. 8 or FIG. 9 (each unit and module of FIG. 8 or FIG. 9 are not shown in FIG. 11).

The apparatus 1100 includes:

a fourth acquiring unit 1101 configured to acquire a third matching point pair between the image captured by the first camera and the image captured by the second camera;

a seventh generating unit 1102 configured to generate the first rotation matrix according to the third matching point pair, where the first rotation matrix represents a rotation matrix of the first camera in a second camera coordinate system;

a fifth acquiring unit 1103 configured to acquire a ninth rotation matrix, where the ninth rotation matrix represents a rotation matrix of the first camera in a world coordinate system;

an eighth generating unit 1104 configured to generate a tenth rotation matrix according to the first rotation matrix and the ninth rotation matrix, where the tenth rotation matrix represents a rotation matrix of the second camera in the world coordinate system; and a ninth generating unit 1105 configured to generate the three-dimensional perception information of the first camera according to the ninth rotation matrix, and generate three-dimensional perception information of the image captured by the second camera according to the tenth rotation matrix.

In an example, the fifth acquiring unit 1103 includes:

a fourth determining module configured to acquire three-dimensional coordinate information of a mark point, and determine two-dimensional coordinate information of the mark point on the image captured by the first camera according to the image captured by the first camera; and a second resolving module configured to perform resolution processing on the three-dimensional coordinate information of the mark point and the two-dimensional coordinate information of the mark point on the image captured by the first camera to obtain the ninth rotation matrix.

In an example, the ninth rotation matrix is configured to calibrate parameters of the first camera, and the tenth rotation matrix is configured to calibrate parameters of the second camera.

The apparatus in the embodiment may execute the technical solutions in the foregoing method, and the specific implementation process and the technical principles are the same, which are not described herein again.

According to an embodiment of the present application, the present application further provides an electronic device and a readable storage medium.

According to an embodiment of the present application, the present application further provides a computer program product, where the program product includes a computer program stored in a readable storage medium; at least one processor of an electronic device can read the computer program from the readable storage medium; and at least one processor executes the computer program to cause the electronic device to execute the solution provided by any of the above embodiments.

Figure 12:
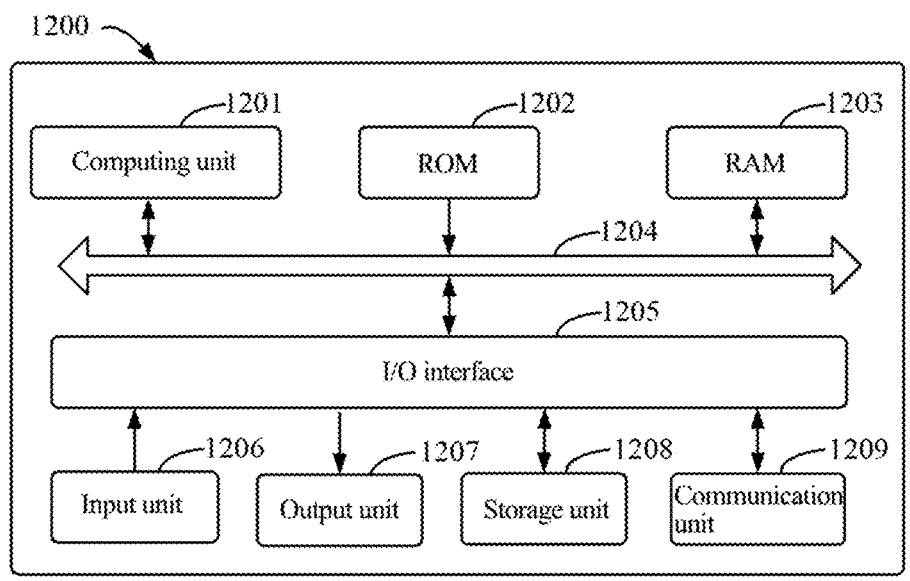
FIG. 12 shows a schematic block diagram of an example electronic device 1200 that may be configured to implement embodiments of the present application.

FIG. 12 shows a schematic block diagram of an example electronic device 1200 that may be configured to implement embodiments of the present application. The electronic device is intended to represent various forms of digital computers, such as laptops, desktops, workstations, personal digital assistants, servers, blade servers, mainframes, and other appropriate computers. The electronic device may also represent various forms of mobile devices, such as personal digital processors, cellular telephones, smart phones, wearable devices, and other similar computing apparatuses. The components shown herein, their connections and relationships, and their functions, are meant to be examples only, and are not intended to limit implementations of the disclosure described and/or claimed herein.

As shown in FIG. 12, the electronic device 1200 includes a computing unit 1201 that can perform various appropriate operations and processes according to a computer program stored in a read-only memory (ROM) 1202 or a computer program loaded from a storage unit 1208 into a random access memory (RAM) 1203. In the RAM 1203, various programs and data required for operations of the device 1200 may also be stored. The computing unit 1201, the ROM 1202, and the RAM 1203 are connected to each other through a bus 1204. An input/output (I/O) interface 1205 is also connected to the bus 1204.

A plurality of components of the device 1200 are connected to the I/O interface 1205, including an input unit 1206, such as a keyboard, a mouse, and the like; an output unit 1207, such as various types of displays, speakers, and the like; a storage unit 1208, such as a magnetic disk, an optical disk, and the like; and a communication unit 1209, such as a network card, a modem, a wireless communication transceiver, and the like. The communication unit 1209 allows the device 1200 to exchange information/data with other devices through a computer network such as the Internet and/or various telecommunication networks.

The computing unit 1201 may be a variety of general and/or specific processing components with processing and computing capabilities. Some examples of the computing unit 1201 include, but are not limited to, a central processing unit (CPU), a graphics processing unit (GPU), various specific artificial intelligence (AI) computing chips, various computing units running machine learning model algorithms, a digital signal processor (DSP), and any suitable processor, controller, microcontroller, etc. The computing unit 1201 performs the various methods and processes described above, for example, the acquiring of three-dimensional perception information based on external parameters of a roadside camera. For example, in some embodiments, the acquiring of the three-dimensional perception information based on the external parameters of the roadside camera may be implemented as a computer software program contained in a machine-readable medium tangibly, such as the storage unit 1208. In some embodiments, some or all of the computer programs may be loaded and/or installed into the device 1200 via the ROM 1202 and/or the communication unit 1209. When the computer program is loaded into the RAM 1203 and executed by the computing unit 1201, one or more steps of the acquiring of the three-dimensional perception information based on the external parameters of the roadside camera described above may be performed. Alternatively, in other embodiments, the computing unit 1201 may be configured to perform the acquiring of the three-dimensional perception information based on the external parameters of the roadside camera in any other suitable manner (e.g. by means of firmware).

Various implementations of the systems and techniques described here can be realized in a digital electronic circuit system, an integrated circuit system, field programmable gate arrays (FPGA), application specific integrated circuits (ASIC), application specific standard products (ASSP), a system-on-chip system (SOC), a complex programming logic device (CPLD), a computer hardware, a firmware, software, and/or their combinations. These various implementations may include a implementation implemented in one or more computer programs that are executable and/or interpretable in a programmable system including at least one programmable processor. The programmable processor may be specific or general, and may receive data and instructions from, and transmit data and instructions to, a storage system, at least one input apparatus, and at least one output apparatus.

Program codes for implementing the method of the present disclosure may be written in any combination of one or more programming languages. These program codes may be provided to a processor or a controller of a general computer, a specific computer or other programmable data processing apparatuses causing the functions/operations specified in the flowchart and/or block diagram to be implemented when the program codes are executed by the processor or the controller. The program codes may be executed entirely by the machine, partially by the machine, partially by the machine as a stand-alone software package and partially by a remote machine or entirely by a remote machine or server.

In the context of the present disclosure, a machine readable medium may be a tangible medium that may contain or store a program for use by an instruction execution system, apparatus, or device or a program for use in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage media may include electrical connections based on one or more wires, portable computer disks, hard disks, a random access memory (RAM), a read only memory (ROM), an erasable programmable read only memory (EPROM or a flash memory), optical fibers, a compact disk read only memory (CD-ROM), optical storage devices, magnetic storage devices, or any suitable combination of the foregoing.

To provide for interaction with a user, the systems and techniques described here can be implemented on a computer. The computer has: a display apparatus (e.g. a CRT (cathode ray tube) or an LCD (liquid crystal display) monitor) for displaying information to a user; and a keyboard and a pointing apparatus (e.g. a mouse or a trackball). A user may provide input to the computer through the keyboard and the pointing apparatus. Other kinds of apparatuses may also be used to provide for interaction with the user. For example, feedback provided to the user can be any form of sensory feedback (e.g. visual feedback, auditory feedback, or tactile feedback). And input from the user can be received in any form (including acoustic, speech, or tactile input).

The systems and techniques described here can be implemented in a computing system that includes a back-end component (e.g. as a data server), or that includes a middleware component (e.g. an application server), or that includes a front-end component (e.g. a user computer having a graphical user interface or a web browser through which a user can interact with an implementation of the systems and techniques described here), or any combination of such back-end, middleware, or front-end components. The components of the systems can be interconnected by any form or medium of digital data communication (e.g. a communication network). Examples of communication networks include: local area networks (LANs), wide area networks (WAN), and the Internet.

A computer system may include a client and a server. The client and the server are generally located remotely from each other and typically interact through a communication network. The relationship of client and server arises by virtue of computer programs running on respective computers and having a client-server relationship therebetween.

The embodiment further provides a roadside device, where the roadside device includes an electronic device provided by the foregoing embodiment.

For example, the roadside device is a roadside perception device having a computing function and a roadside computing device connected to the roadside perception device.

In a system architecture of intelligent traffic vehicle-road collaboration, a roadside device includes a roadside perception device and a roadside computing device, the roadside perception device (for example, a roadside camera) is connected to the roadside computing device (for example, a roadside computing unit RSCU), the roadside computing device is connected to the server device, and the server device can communicate with an automatic driving vehicle or an assisting driving vehicle in various ways; In another system architecture, the roadside perception device itself includes a computing function, and the roadside perception device is directly connected to the server device. The above connections may be wired or wireless; and in the present application, the server device is, for example, a cloud control platform, a vehicle-road collaboration management platform, a central subsystem, an edge computing platform, a cloud computing platform, etc.

The embodiment further provides a cloud control platform, where the cloud control platform includes an electronic device provided by the foregoing embodiment.

It should be appreciated that, steps may be reordered, added, or deleted according to the various processes described above. For example, the steps described in the present application may be executed in parallel, sequentially, or in different orders, which are not limited herein as long as the desired results of the technical solutions disclosed in the present application can be achieved.

What are stated above are simply preferred embodiments of the present application and not intended to limit the present application. A person skilled in the art may appreciate that modifications, combinations, sub-combinations and substitutions can be made according to design requirements and other factors. Any modifications, equivalent substitutions and improvements made within the spirit and the principle of the present application all should be included in the extent of protection of the present application.

What is claimed is:

1. A method for acquiring three-dimensional perception information based on external parameters of a roadside camera, the roadside camera comprising a first camera and a second camera having a common view area, wherein the method comprises:

acquiring a first matching point pair between an image captured by the first camera and an image captured by the second camera, and generating a first rotation matrix according to the first matching point pair, wherein the first rotation matrix represents a rotation matrix of the first camera in a second camera coordinate system;

acquiring a second rotation matrix, wherein the second rotation matrix represents a rotation matrix of the second camera in a world coordinate system, and generating a third rotation matrix according to the first rotation matrix and the second rotation matrix, wherein the third rotation matrix represents a rotation matrix of the first camera in the world coordinate system; and generating three-dimensional perception information of the image captured by the first camera according to the third rotation matrix;

wherein the generating the first rotation matrix according to the first matching point pair comprises: generating a fourth rotation matrix according to the first matching point pair, wherein the fourth rotation matrix represents a rotation matrix of the second camera in an equivalent camera coordinate system; and acquiring a fifth rotation matrix, wherein the fifth rotation matrix represents a rotation matrix of the first camera in the equivalent camera coordinate system, and generating the first rotation matrix according to the fourth rotation matrix and the fifth rotation matrix.

2. The method according to claim 1, wherein the acquiring the first matching point pair between the image captured by the first camera and the image captured by the second camera comprises:

generating a first de-distorted image according to the image captured by the first camera, and generating a second de-distorted image according to the image captured by the second camera, wherein the first de-distorted image and the second de-distorted image have image areas located under the common view area respectively;

extracting a first image feature of an image area located under the common view area of the first de-distorted image, and extracting a second image feature of an image area located under the common view area of the second de-distorted image; and determining, based on the first image feature and the second image feature, the first matching point pair between the image captured by the first camera and the image captured by the second camera.

3. The method according to claim 2, wherein the determining, based on the first image feature and the second image feature, the first matching point pair between the image captured by the first camera and the image captured by the second camera comprises:

performing, based on the first image feature and the second image feature, feature matching on the first de-distorted image and the second de-distorted image to obtain the first matching point pair.

4. The method according to claim 2, wherein the generating the first de-distorted image according to the image captured by the first camera, and generating the second de-distorted image according to the image captured by the second camera comprises:

projecting the image captured by the first camera on a spherical surface to obtain a spherical image;

performing de-distortion processing on the spherical image to obtain the first de-distorted image; and adjusting the image captured by the second camera by using a de-distortion function to obtain the second de-distorted image.

5. The method according to claim 1, wherein the acquiring the fifth rotation matrix comprises:

transforming a first camera coordinate system in which the image captured by the first camera is located according to a preset pitch angle and a yaw angle, to obtain the fifth rotation matrix.

6. The method according to claim 1, wherein the acquiring the second rotation matrix comprises:

acquiring three-dimensional coordinate information of a mark point, and determining two-dimensional coordinate information of the mark point on the image captured by the second camera according to the image captured by the second camera; and performing resolution processing on the three-dimensional coordinate information of the mark point and the two-dimensional coordinate information of the mark point on the image captured by the second camera to obtain the second rotation matrix.

7. The method according to claim 1, wherein the generating the three-dimensional perception information of the image captured by the first camera according to the third rotation matrix comprises:

converting, according to the third rotation matrix, two-dimensional perception information of the image captured by the first camera into the world coordinate system to generate the three-dimensional perception information of the image captured by the first camera.

8. The method according to claim 1, wherein the method further comprises:

converting, according to the second rotation matrix, two-dimensional perception information of the image captured by the second camera into the world coordinate system to generate three-dimensional perception information of the image captured by the second camera.

9. The method according to claim 1, wherein the three-dimensional perception information is used for three-dimensional perception positioning of an automatic driving vehicle.

10. The method according to claim 1, wherein the second rotation matrix is configured to calibrate parameters of the second camera, and the third rotation matrix is configured to calibrate parameters of the first camera.

11. The method according to claim 1, wherein the first camera is a fisheye camera, and the second camera is a rear-view gun camera; or the first camera is a fisheye camera, and the second camera is a front-view gun camera.

12. The method according to claim 1, wherein the roadside camera further comprises a third camera having a common view area with the first camera; wherein after the generating the three-dimensional perception information of the image captured by the first camera according to the third rotation matrix, further comprising:

acquiring a second matching point pair between the image captured by the first camera and an image captured by the third camera, and generating a sixth rotation matrix according to the second matching point pair, wherein the sixth rotation matrix represents a rotation matrix of the third camera in a first camera coordinate system;

generating a seventh rotation matrix according to the third rotation matrix and the sixth rotation matrix, wherein the seventh rotation matrix represents a rotation matrix of the third camera in the world coordinate system; and generating three-dimensional perception information of the image captured by the third camera according to the seventh rotation matrix.

13. The method according to claim 12, wherein the acquiring the second matching point pair between the image captured by the first camera and the image captured by the third camera comprises:

generating a first de-distorted image according to the image captured by the first camera, and generating a third de-distorted image according to the image captured by the third camera, wherein the first de-distorted image and the third de-distorted image have image areas located under the common view area respectively;

extracting a first image feature of an image area located under the common view area of the first de-distorted image, and extracting a third image feature of an image area located under the common view area of the third de-distorted image; and determining, based on the first image feature and the third image feature, the second matching point pair between the image captured by the first camera and the image captured by the third camera.

14. The method according to claim 13, wherein the determining, based on the first image feature and the third image feature, the second matching point pair between the image captured by the first camera and the image captured by the third camera comprises:

performing, based on the first image feature and the third image feature, feature matching on the first de-distorted image and the third de-distorted image to obtain the second matching point pair;

wherein the generating the third de-distorted image according to the image captured by the third camera comprises:

adjusting the image captured by the third camera by using a de-distortion function to obtain the third de-distorted image.

15. The method according to claim 12, wherein the generating the sixth rotation matrix according to the second matching point pair comprises:

generating an eighth rotation matrix according to the second matching point pair, wherein the eighth rotation matrix represents a rotation matrix of the third camera in an equivalent camera coordinate system; and acquiring a fifth rotation matrix, wherein the fifth rotation matrix represents a rotation matrix of the first camera in the equivalent camera coordinate system, and generating the sixth rotation matrix according to the fifth rotation matrix and the eighth rotation matrix;

wherein if the first camera is a fisheye camera and the second camera is a rear-view gun camera, the third camera is a front-view gun camera; and if the first camera is a fisheye camera and the second camera is a front-view gun camera, the third camera is a rear-view gun camera.

16. The method according to claim 12, wherein the three-dimensional perception information of the image captured by the third camera is used for three-dimensional perception positioning of an automatic driving vehicle; and the seventh rotation matrix is configured to calibrate parameters of the third camera.

17. The method according to claim 1, the method further comprises:

acquiring a third matching point pair between the image captured by the first camera and the image captured by the second camera, and generating the first rotation matrix according to the third matching point pair, wherein the first rotation matrix represents the rotation matrix of the first camera in the second camera coordinate system;

acquiring a ninth rotation matrix, wherein the ninth rotation matrix represents the rotation matrix of the first camera in the world coordinate system, and generating a tenth rotation matrix according to the first rotation matrix and the ninth rotation matrix, and the tenth rotation matrix represents a rotation matrix of the second camera in the world coordinate system; and generating the three-dimensional perception information of the first camera according to the ninth rotation matrix, and generating three-dimensional perception information of the image captured by the second camera according to the tenth rotation matrix;

wherein the acquiring the ninth rotation matrix comprises:

acquiring three-dimensional coordinate information of a mark point, and determining two-dimensional coordinate information of the mark point on the image captured by the first camera according to the image captured by the first camera; and performing resolution processing on the three-dimensional coordinate information of the mark point and the two-dimensional coordinate information of the mark point on the image captured by the first camera to obtain the ninth rotation matrix;

wherein the ninth rotation matrix is configured to calibrate parameters of the first camera, and the tenth rotation matrix is configured to calibrate parameters of the second camera.

18. An electronic device, comprising:

at least one processor; and a memory communicatively coupled to the at least one processor, wherein the memory stores instructions executable by the at least one processor, and the instructions are executed by the at least one processor to cause the at least one processor to:

acquire a first matching point pair between an image captured by a first camera and an image captured by a second camera, and generate a first rotation matrix according to the first matching point pair, wherein the first rotation matrix represents a rotation matrix of the first camera in a second camera coordinate system;

acquire a second rotation matrix, wherein the second rotation matrix represents a rotation matrix of the second camera in a world coordinate system, and generate a third rotation matrix according to the first rotation matrix and the second rotation matrix, wherein the third rotation matrix represents a rotation matrix of the first camera in the world coordinate system; and generate three-dimensional perception information of the image captured by the first camera according to the third rotation matrix;

wherein the instructions are executed by the at least one processor to cause the at least one processor to: generate a fourth rotation matrix according to the first matching point pair, wherein the fourth rotation matrix represents a rotation matrix of the second camera in an equivalent camera coordinate system; and acquire a fifth rotation matrix, wherein the fifth rotation matrix represents a rotation matrix of the first camera in the equivalent camera coordinate system, and generate the first rotation matrix according to the fourth rotation matrix and the fifth rotation matrix.

19. The electronic device according to claim 18, wherein the instructions are executed by the at least one processor to cause the at least one processor to:

generate a first de-distorted image according to the image captured by the first camera, and generate a second de-distorted image according to the image captured by the second camera, wherein the first de-distorted image and the second de-distorted image have image areas located under the common view area respectively;

extract a first image feature of an image area located under the common view area of the first de-distorted image, and extract a second image feature of an image area located under the common view area of the second de-distorted image; and determine, based on the first image feature and the second image feature, the first matching point pair between the image captured by the first camera and the image captured by the second camera.

20. A non-transitory computer readable storage medium having computer instructions stored thereon, wherein the computer instructions are configured to cause a computer to:

acquire a first matching point pair between an image captured by a first camera and an image captured by a second camera, and generate a first rotation matrix according to the first matching point pair, wherein the first rotation matrix represents a rotation matrix of the first camera in a second camera coordinate system;

acquire a second rotation matrix, wherein the second rotation matrix represents a rotation matrix of the second camera in a world coordinate system, and generate a third rotation matrix according to the first rotation matrix and the second rotation matrix, wherein the third rotation matrix represents a rotation matrix of the first camera in the world coordinate system; and generate three-dimensional perception information of the image captured by the first camera according to the third rotation matrix;

wherein the computer instructions are configured to cause a computer to: generate a fourth rotation matrix according to the first matching point pair, wherein the fourth rotation matrix represents a rotation matrix of the second camera in an equivalent camera coordinate system; and acquire a fifth rotation matrix, wherein the fifth rotation matrix represents a rotation matrix of the first camera in the equivalent camera coordinate system, and generate the first rotation matrix according to the fourth rotation matrix and the fifth rotation matrix.

* * * * *